US012072150B2

(12) United States Patent
Kuwayama et al.

(10) Patent No.: US 12,072,150 B2
(45) Date of Patent: Aug. 27, 2024

(54) HEATING FURNACE

(71) Applicant: NIPPON STEEL TEXENG. CO., LTD., Tokyo (JP)

(72) Inventors: Shinjiro Kuwayama, Tokyo (JP); Tetsuya Irie, Kasuya-gun (JP)

(73) Assignee: NIPPON STEEL TEXENG. CO., LTD., Tokyo (JP)

( * ) Notice: Subject to any disclaimer, the term of this patent is extended or adjusted under 35 U.S.C. 154(b) by 736 days.

(21) Appl. No.: 17/275,876

(22) PCT Filed: Apr. 11, 2019

(86) PCT No.: PCT/JP2019/015771
§ 371 (c)(1),
(2) Date: Mar. 12, 2021

(87) PCT Pub. No.: WO2020/066087
PCT Pub. Date: Apr. 2, 2020

(65) Prior Publication Data

US 2021/0254894 A1 Aug. 19, 2021

(30) Foreign Application Priority Data

Sep. 28, 2018 (JP) ................................ 2018-185440

(51) Int. Cl.
*F27D 11/02* (2006.01)
*F27B 17/00* (2006.01)
(Continued)

(52) U.S. Cl.
CPC .............. *F27D 11/02* (2013.01); *F27B 17/00* (2013.01); *C21D 1/34* (2013.01); *C21D 1/673* (2013.01)

(58) Field of Classification Search
CPC .......... B21D 7/162; B21D 7/16; B21D 7/165; B21D 7/12; B21D 7/08; B21D 7/04;
(Continued)

(56) References Cited

U.S. PATENT DOCUMENTS 10,870,909 B2 * 12/2020 Fujita .................. C21D 9/0043

FOREIGN PATENT DOCUMENTS

CN 106661643 A 5/2017
CN 108139164 A 6/2018
(Continued)

OTHER PUBLICATIONS

JP2002175868A Translation, "Far-infrared Thin Heater and Substrate-Heating Furnace", Jun. 21, 2002, by ProQuest (Year: 2002).*
(Continued)

*Primary Examiner* — Quang T Van
(74) *Attorney, Agent, or Firm* — Birch, Stewart, Kolasch & Birch, LLP

(57) ABSTRACT

This heating furnace includes a housing having a pair of side walls, a workpiece support material to support a workpiece, a planar heater to heat the workpiece supported by the workpiece support material from above or below, a power feeding device to feed power to the planar heater. The planar heater has a plurality of heating bodies disposed side by side in a conveyance direction and in a left-right direction orthogonal to the conveyance direction in a plan view, the heating bodies each have a heating wire and a sintered body to accommodate the heating wire, include two or more kinds of heating bodies, and include an intermediate heating body alongside which other heating bodies are disposed at both end portions in the left-right direction, and the power feeding device has a feeding unit configured to feed power to each of the heating bodies from the side wall.

6 Claims, 22 Drawing Sheets

(51) Int. Cl.
*C21D 1/34* (2006.01)
*C21D 1/673* (2006.01)

(58) Field of Classification Search
CPC .... B21D 11/10; B21D 35/002; B21D 43/006; B21D 11/18; B21D 22/022; B21D 37/16; B21D 24/00; Y02P 10/25; Y10T 428/1241; Y10T 29/5137; Y10T 428/12292; C21D 1/34; C21D 9/00; C21D 9/46; C21D 1/00; C21D 1/18; C21D 1/673; F27D 11/12; F27D 5/0006; F27D 11/02; H05B 3/009; H05B 3/0061; H05B 3/06; H05B 3/62; H05B 3/66; B21B 1/00; B21B 39/00; B23Q 3/02; B25J 9/0048; B25J 9/009; B25J 15/0014; F27B 17/0016; F27B 5/02; F27B 5/06; F27B 9/068; F27B 17/00; G02B 6/428; G02B 6/4292; G02B 6/421; G02B 6/4214; G02B 6/4245; G02B 6/4246; G02B 6/4249; G02B 6/4256; G02B 6/4269; G02B 6/4279; G02B 6/4281; G02B 6/4284; G02B 6/4441; G02B 6/4448; Y10S 901/03; Y10S 901/27; B65G 49/00; B65H 5/00
USPC ........ 373/127, 130, 117, 118, 119, 125, 128, 373/129
See application file for complete search history.

(56) References Cited

FOREIGN PATENT DOCUMENTS

| | | | |
|---|---|---|---|
| JP | 3060663 | U | 9/1999 |
| JP | 2001-307861 | A | 11/2001 |
| JP | 2002-175868 | A | 6/2002 |
| JP | 2010-54157 | A | 3/2010 |
| JP | 2014-34689 | A | 2/2014 |
| JP | 2015-229798 | A | 12/2015 |

OTHER PUBLICATIONS

JP2010054157A Translation, "Heater Unit and Heat Treatment Device", Mar. 11, 2010, by ProQuest. (Year: 2010).*
Chinese Office Action and Search Report for corresponding Chinese Application No. 201980062837.X, dated May 16, 2022, with English translation of the Search Report.
International Search Report (Form PCT/ISA/210) for International Application No. PCT/JP2019/015771, dated Jul. 2, 2019, with English translation.
Japanese Notice of Allowance for counterpart Japanese Application No. 2020-547934, dated Aug. 17, 2021, with English translation.

* cited by examiner

HEATING FURNACE

TECHNICAL FIELD OF THE INVENTION

The present invention relates to a heating furnace.

The present application claims priority based on Japanese Patent Application No. 2018-185440 filed in Japan on Sep. 28, 2018, the contents of which are incorporated herein by reference.

RELATED ART

As a method for press-forming the components of automobile bodies, hot pressing methods (also referred to as hot stamping methods) are known. In the hot pressing methods, steel plates for hot pressing (blanks) that are subjected to press forming are press-formed and quenched by rapid cooling immediately after being heated to a temperature that is equal to or higher than the $Ac_3$ point in a heating furnace. This treatment is also referred to as die quenching. With this treatment, high-strength press-formed articles having a desired shape are manufactured.

In the related art, as heating furnaces for heating steel plates for hot pressing, multistage heating furnaces have been used. For example, a heating apparatus for quenching a steel plate disclosed in Patent Document 1 includes a plurality of planar electric heaters. The plurality of electric heaters are disposed side by side in the vertical direction, and the inside of the heating apparatus is partitioned into a plurality of heating chambers with the plurality of electric heaters. In the heating apparatus of Patent Document 1, a workpiece loaded into the heating apparatus is heated from above and below with the plurality of electric heaters.

PRIOR ART DOCUMENT

[Patent Document]

[Patent Document 1] Japanese Unexamined Patent Application, First Publication No. 2014-34689

DISCLOSURE OF THE INVENTION

Problems to be Solved by the Invention

In heating apparatuses, workpieces having a variety of shapes and dimensions are heated. Therefore, the present inventors studied heat treatments of a variety of workpieces performed by dividing a heater 100 into a plurality of heating bodies 100*a* to 100*d* that could be individually controlled as shown in FIG. 1 and adjusting the heating temperature in each of the heating bodies 100*a* to 100*d*. It should be noted that FIG. 1 is a plan view showing the heater 100.

For example, in the case of performing a heat treatment of a workpiece 102*a* as shown in FIG. 2(*a*), the entire workpiece 102*a* can be appropriately heated with two heating bodies 100*b* and 100*c* disposed side by side among the plurality of heating bodies 100*a* to 100*d* in the heater 100. In addition, since heating with the other heating bodies 100*a* and 100*d* can be stopped, it is possible to reduce energy that is consumed during the heat treatment. Furthermore, in the case of performing a heat treatment of a large workpiece 102*b* as shown in FIG. 2(*b*), the entire workpiece 102*b* can be appropriately heated with all of the heating bodies 100*a* to 100*d* in the heater 100.

As described above, when the heater 100 is divided into the plurality of heating bodies 100*a* to 100*d*, it is possible to efficiently perform heat treatments of workpieces having different shapes and dimensions. However, as a result of additional studies by the present inventors, it was found that, in a case where the plurality of heating bodies 100*a* to 100*d* have the same shape and dimensions as in the heater 100 shown in FIG. 1, the following problem arises. FIG. 3 is a view for describing the problem that arises when a heat treatment of a workpiece is performed with the heater 100 of FIG. 1.

In the case of performing a heat treatment of a workpiece 102*c* having a shape and dimensions as shown in FIG. 3, it is necessary to heat the workpiece 102*c* using all of the heating bodies 100*a* to 100*d*. At this time, in a plan view, an outer peripheral portion 101 of the heater 100 does not overlap the workpiece 102*c*. In this case, in a portion of the heater 100 that overlaps the workpiece 102*c* in a plan view, heat is released due to the workpiece 102*c*, and thus the temperature is likely to decrease. However, in the outer peripheral portion 101, heat is not released due to the lack of the workpiece 102*c*, and thus the temperature does not decrease. Therefore, when an attempt is made to maintain the temperature of the portion of the heater 100 that overlaps the workpiece 102*c* at a predetermined heating temperature, the temperature of the outer peripheral portion 101 of the heater 100 becomes too high. As a result, it is not possible to uniformly heat the entire workpiece 102*c*.

The above-described problem can be solved by, for example, finely dividing the heater 100 into a number of heating bodies and stopping the output of the heating bodies in the portion that does not overlap the workpiece 102*c* in a plan view. However, the manufacturing cost of the heater 100 increases, and as a result, the manufacturing cost of the heating furnace increases.

Therefore, an object of the present invention is to provide a low-cost heating furnace capable of appropriately heating workpieces having a variety of shapes and dimensions.

Means for Solving the Problem

One aspect of the present invention is a heating furnace including a housing having a pair of side walls, a workpiece support material configured to support a workpiece having a flat plate shape in a horizontal posture between the pair of side walls, a planar heater configured to heat the workpiece supported by the workpiece support material from above or below, a power feeding device configured to feed power to the planar heater, and a heater support material configured to support the planar heater in a horizontal posture. The planar heater has a plurality of heating bodies disposed side by side in a conveyance direction and in a left-right direction orthogonal to the conveyance direction in a plan view, the plurality of heating bodies each have a heating wire and a sintered body configured to accommodate the heating wire, include two or more kinds of heating bodies having different dimensions or shapes, and include an intermediate heating body alongside which other heating bodies are disposed at both end portions in the left-right direction, and the power feeding device has a feeding unit configured to feed power to each of the heating bodies from the side wall.

Effects of the Invention

According to the present invention, a low-cost heating furnace capable of appropriately heating workpieces having a variety of shapes and dimensions can be obtained.

EMBODIMENTS OF THE INVENTION

Hereinafter, embodiments for carrying out the present invention will be described with reference to drawings.

(Basic Configuration of Heat Treatment Device)

Figure 1:
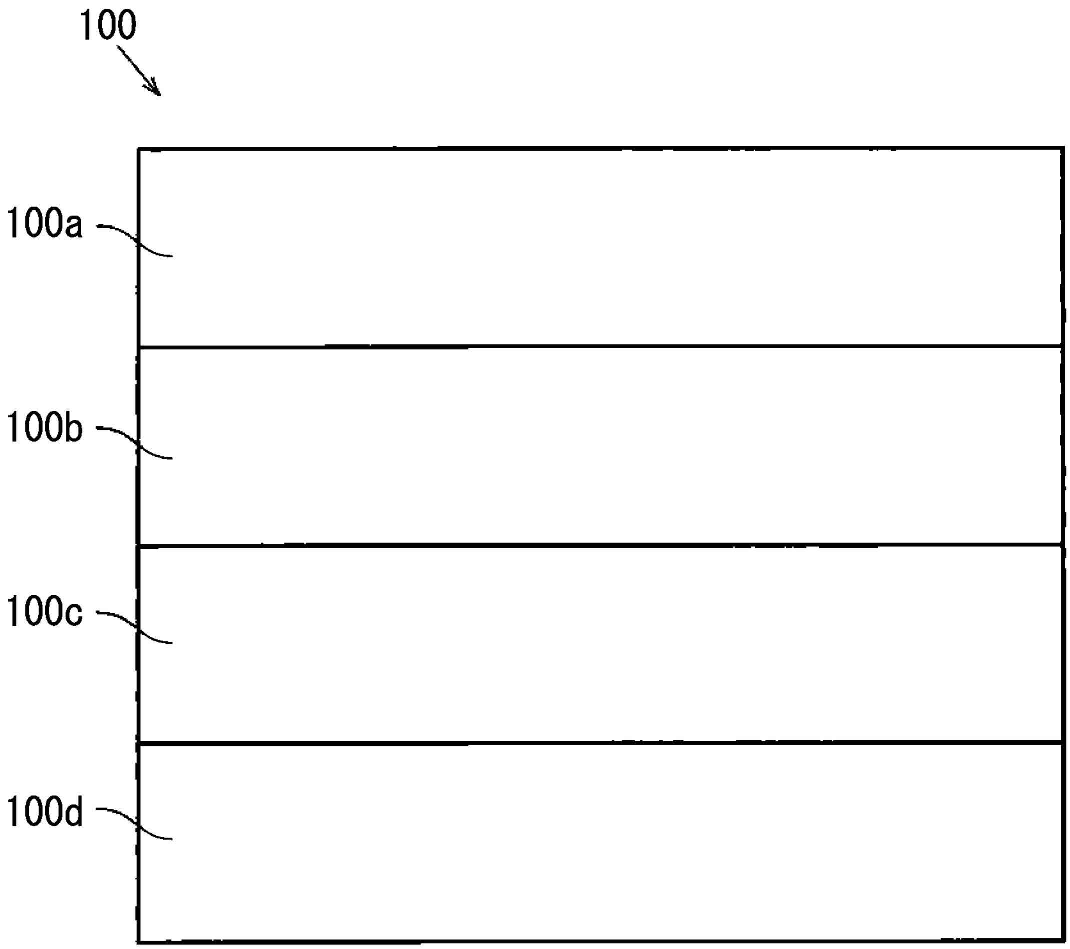
FIG. 1 is a plan view showing an example of a heater.
Figure 2:
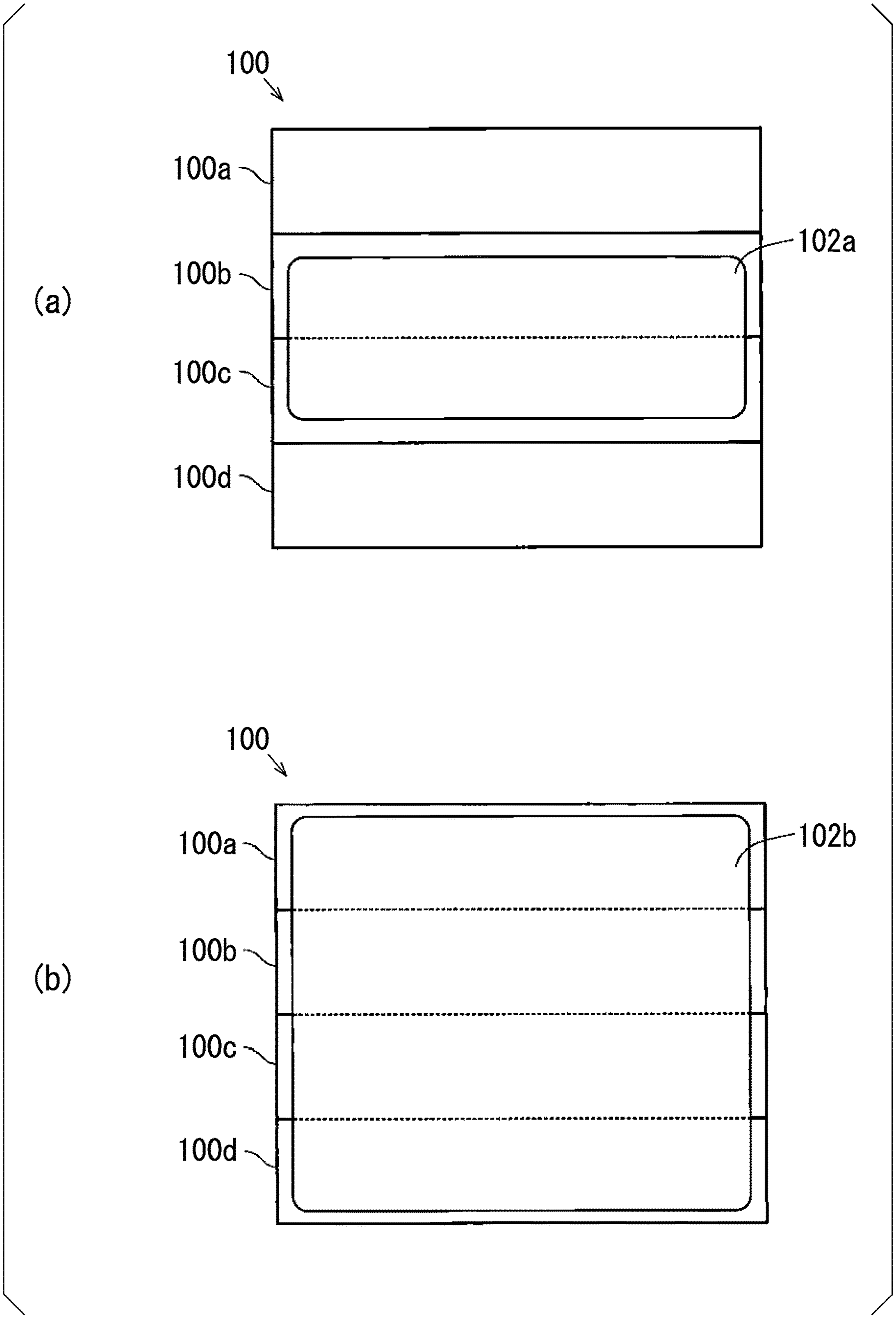
FIG. 2 is a plan view showing the heater at the time of heating a workpiece.
Figure 3:
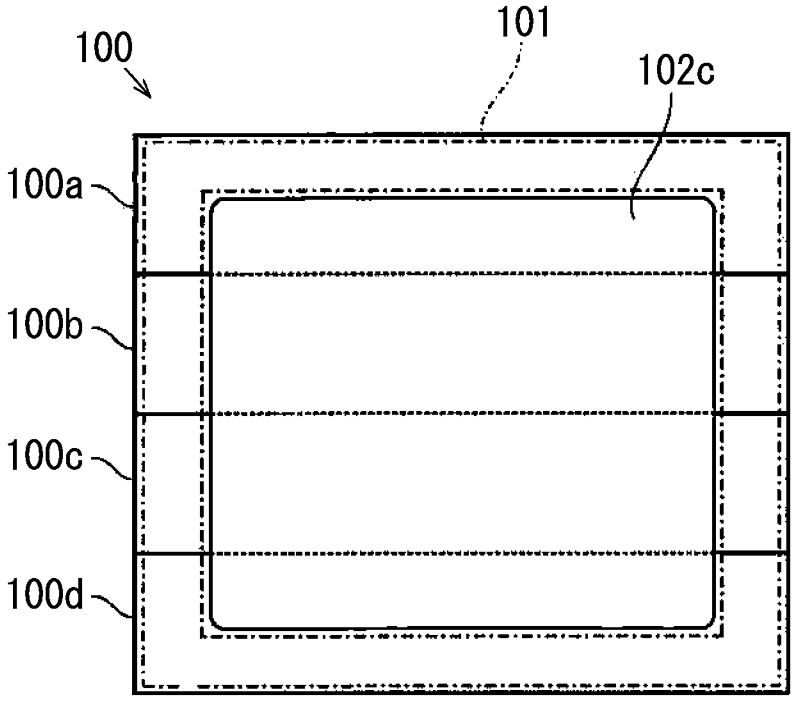
FIG. 3 is a view for describing a problem that arises when a heat treatment of a workpiece is performed with the heater of FIG. 1.
Figure 4:
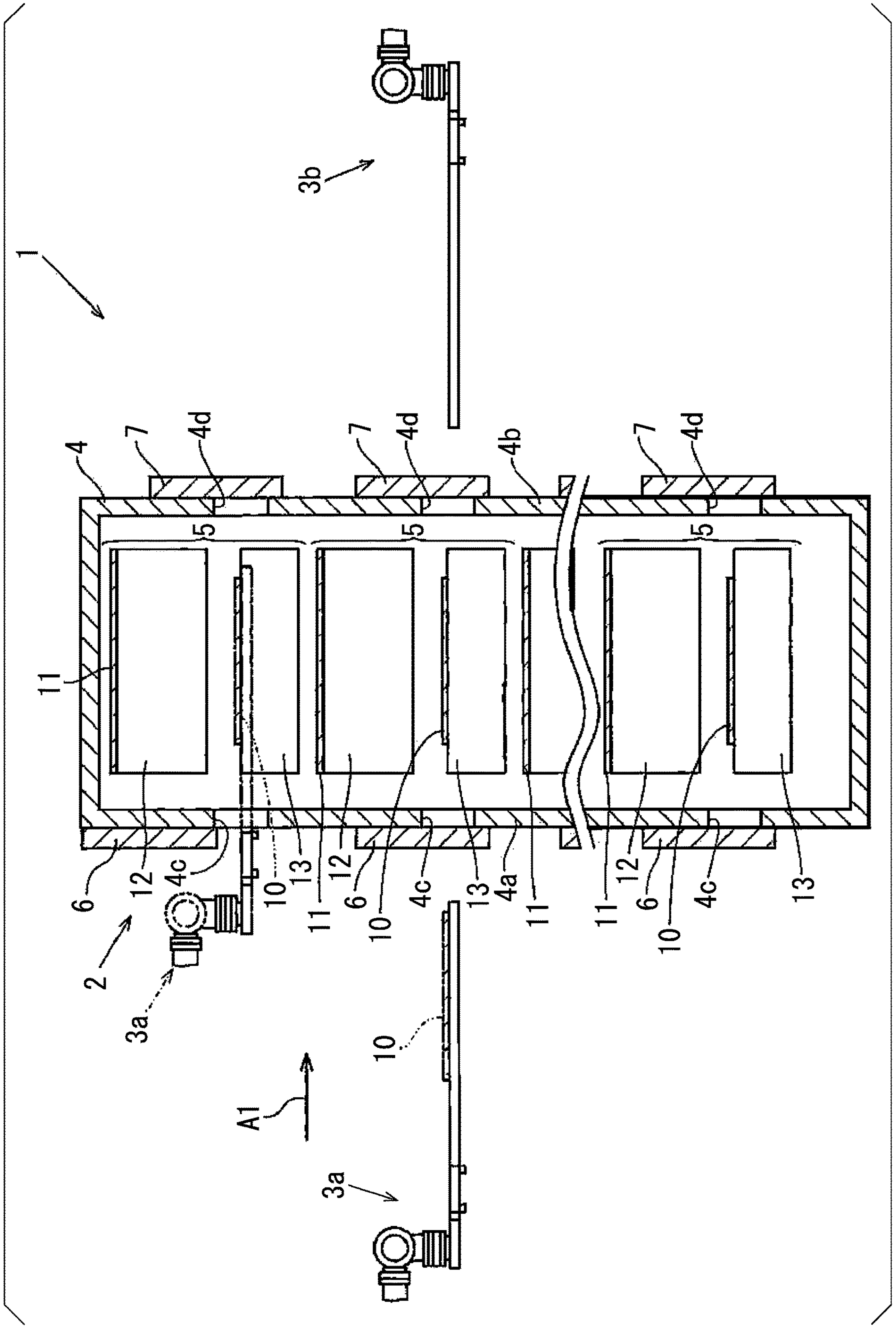
FIG. 4 is a schematic view showing the configuration of a heat treatment device including a heating furnace according to an embodiment of the present invention.
Figure 5:
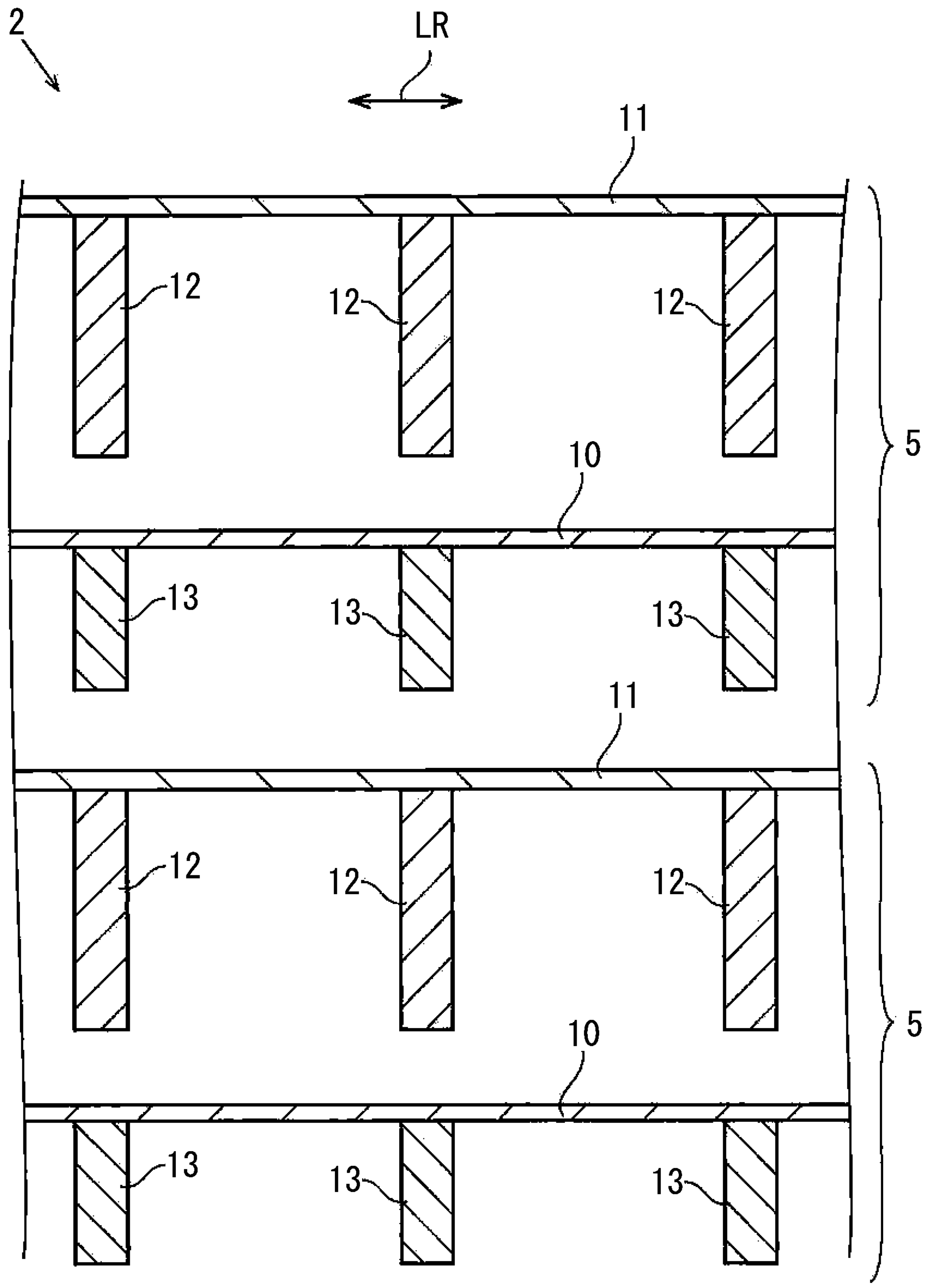
FIG. 5 is a schematic view showing the configuration of a main part of the heating furnace according to the embodiment of the present invention.

FIG. 4 is a schematic partial cross-sectional side view of a heat treatment device 1 including a heating furnace 2 according to an embodiment of the present invention and shows only a part of the heat treatment device 1. FIG. 5 is a schematic view showing the configuration of a main part of the heating furnace 2 and shows a cross section orthogonal to a conveyance direction A1 of a workpiece 10. It should be noted that, hereinafter, a direction orthogonal to the conveyance direction A1 in a plan view will be referred to as the left-right direction LR.

With reference to FIG. 4 and FIG. 5, the heat treatment device 1 is a device configured to heat steel plates for hot pressing as the workpiece 10 for hot pressing processes. The workpiece 10 has, for example, a flat plate shape and is heated in the heat treatment device 1. The heat treatment device 1 heats the workpiece 10 to, for example, the $Ac_3$ point or higher and 950° C. or lower. The workpiece 10 is heated in the heat treatment device 1 and then formed into a predetermined member by a hot pressing process. Examples of the predetermined member include pillars, members, and the like in the monocoque structures of automobiles.

The heat treatment device 1 has the heating furnace 2, a workpiece loading device 3*a*, and a workpiece unloading device 3*b*.

The heating furnace 2 is a furnace configured to heat the workpiece 10 that is loaded with the workpiece loading device 3*a* to, for example, the $Ac_3$ point or higher and 950° C. or lower. In the present embodiment, the heating furnace 2 is a multistage heating furnace and is capable of collectively accommodating N (N is a natural number of one or larger, for example, N=7) workpieces 10.

The heating furnace 2 has a housing 4, N heater units 5 installed side by side in the vertical direction in the housing 4, N inlet shutters 6 and N outlet shutters 7 configured to open and close the housing 4.

The housing 4 is formed in, for example, a substantially square prism shape that is hollow. In addition, in the housing 4, the upstream-side side wall in the conveyance direction A1 of the workpiece 10 in the heat treatment device 1 is a front wall 4*a*. In addition, the downstream-side side wall in the conveyance direction A1 is a rear wall 4*b*. A plurality of opening parts 4*c* and 4*d* for passing the workpiece 10 are formed in the front wall 4*a* and the rear wall 4*b*. Furthermore, the housing 4 includes a side wall 4*e* and a side wall 4*f* in the left-right direction LR of the workpiece 10.

The plurality of (N) opening parts 4*c* are formed vertically at substantially equal pitches. Similarly, the plurality of (N) opening parts 4*d* are formed vertically at substantially equal pitches. The plurality of opening parts 4*c* each preferably have a minimum necessary height that is large enough for the workpiece loading device 3*a* and the workpiece 10 placed on the workpiece loading device 3*a* to be inserted. Similarly, the plurality of opening parts 4*d* each preferably have a minimum necessary height that is large enough for the workpiece unloading device 3*b* and the workpiece 10 placed on the workpiece unloading device 3*b* to be inserted. As the height dimension of each opening part 4*c* or 4*d* decrease, it is possible to further shorten the intervals between the heater units 5. Therefore, it is possible to further increase the heat efficiency of the heating furnace 2.

The inlet shutters 6 are disposed on the plurality of opening parts 4*c*, respectively, and the outlet shutters 7 are disposed on the plurality of opening parts 4*d*, respectively. The inlet shutters 6 and the outlet shutters 7 are opened and closed with an opening and closing mechanism, not shown, thereby opening and closing the corresponding opening parts 4*c* and 4*d*.

The heater unit 5 is disposed between the opening part 4*c* and the opening part 4*d* arranged in the conveyance direction A1. That is, N heater units 5 are disposed between N opening parts 4*c* and N opening parts 4*d* that are arranged in the conveyance direction A1 and form pairs, respectively. The heater units 5 that are vertically disposed side by side are not separated with a partition wall or the like. Therefore, the heater units 5 that are vertically disposed side by side face each other directly.

Each heater unit 5 has a heater 11, a plurality of heater support materials 12, and a plurality of workpiece support materials 13. In the present embodiment, the heater 11 is a far-infrared heater. In addition, in the present embodiment, the heater 11 is a horizontally-disposed planar heater.

In each heater unit 5, the plurality of heater support materials 12 are disposed above the plurality of workpiece support materials 13. The heater 11 is supported by the plurality of heater support materials 12, and the workpiece 10 is supported by the plurality of workpiece support materials 13. The plurality of heater support materials 12 are disposed at substantially equal pitches in the left-right direction LR when viewed along the conveyance direction A1. Similarly, the plurality of workpiece support materials 13 are disposed at substantially equal pitches in the left-right direction LR. The plurality of heater support materials 12 support the heater 11 in cooperation with each other such that the heater 11 is in a horizontal posture, and the plurality of workpiece support materials 13 support the workpiece 10 in cooperation with each other such that the workpiece 10 is in a horizontal posture. Although not described in detail, the plurality of heater support materials 12 and the plurality of workpiece support materials 13 are each supported by the housing 4.

At the time of heating the workpiece 10, first, the inlet shutter 6 that closes the opening part 4*c*, into which the workpiece is loaded, is opened. Next, the workpiece loading device 3*a* conveys the workpiece 10 to the corresponding workpiece support materials 13 through the opening part 4*c* in an open state and places the workpiece 10 on the workpiece support materials 13. Next, the inlet shutter 6 is closed. After that, the workpiece 10 is heated with the heaters 11 positioned above and below the workpiece 10. When this heating operation is completed, the outlet shutter 7 that faces the workpiece 10 in the conveyance direction A1 is opened, whereby the corresponding opening part 4*d* is opened.

Next, the workpiece unloading device 3*b* lifts the workpiece 10 from the workpiece support materials 13 and unloads the workpiece 10 to the outside of the heating furnace 2 through the opening part 4*d* in an open state. The workpiece 10 conveyed to the outside of the heating furnace 2 is formed into a predetermined shape by a hot pressing process with a hot pressing apparatus, not shown.

(Configuration of Heater)

Next, the heater 11 will be described. The heater 11 has a plurality of heating bodies disposed side by side in the conveyance direction A1 and in the left-right direction LR. In addition, the plurality of heating bodies include two or more kinds of heating bodies having different dimensions or shapes. In the present embodiment, the heating body has a heating wire and a sintered body configured to accommodate the heating wire. The sintered body is, for example, far-infrared radiation ceramics such as $Al_2O_3$, $SiO_2$, $ZrO_2$, $TiO_2$, SiC, CoO, or $Si_3N_4$. The sintered body is provided with, for example, a through-hole for accommodating the heating wire. In addition, when an electric current is made to flow through this heating wire, far-infrared energy is radiated from both surfaces (the upper surface and the lower surface) of the heater 11. Hereinafter, the heater will be described in detail with reference to the drawings.

Figure 6:
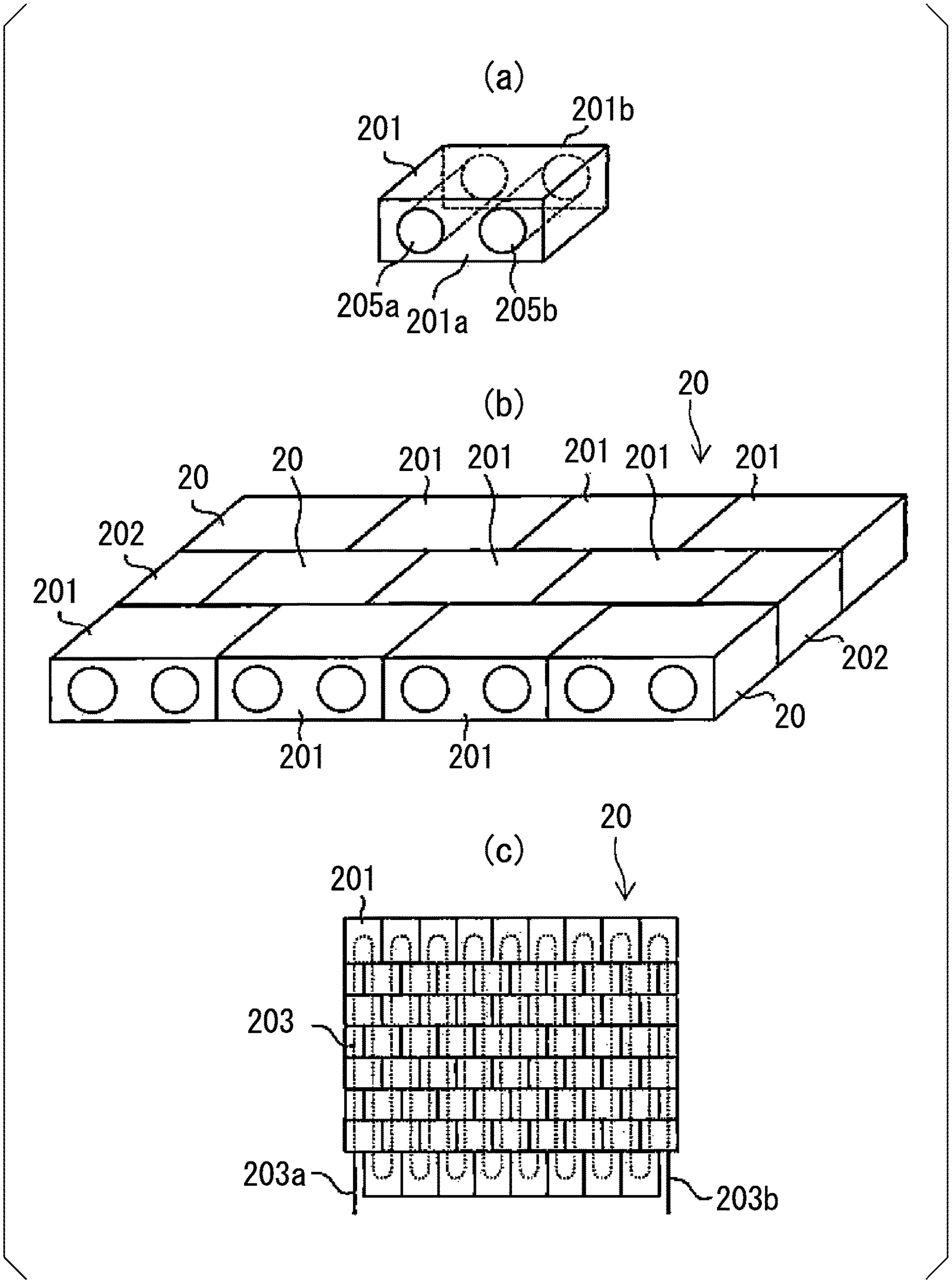
FIG. 6 is a view showing the configuration of a heating body.

FIG. 6 shows perspective views of the configuration of the heating body. FIG. 6(*a*) shows a sintered body block that is a component of the heating body, FIG. 6(*b*) is a partial perspective view of the heating body configured by combining the sintered body blocks, and FIG. 6(*c*) is a plan view of the heating body configured by combining the sintered body blocks. In the present embodiment, as shown in FIG. 6(*a*), a sintered body block 201, which is a component of a heating body 20, has a cubic shape and includes two through-holes 205*a* and 205*b* that are provided to penetrate the sintered body block 201 from a random surface 201*a* through a surface 201*b* opposite to the surface 201*a* and are parallel to each other.

As shown in FIG. 6(*b*), the heating body 20 is configured by disposing a plurality of the sintered body blocks 201 in a zigzag shape. At this time, the sintered body blocks 201 are disposed such that the through-holes 205*a* and 205*b* of the individual sintered body blocks 201 are arranged on the same line as the through-holes of the other sintered body blocks. Some of sintered body blocks 202 each have only one through-hole and are disposed on the side surface sides in the direction perpendicular to the axial direction of the through-holes of the heating body 20.

As shown in FIG. 6(*c*), in the heating body 20, a heating wire 203 is inserted into the through-holes 205*a* and 205*b*, the heating wire 203 runs through the insides of the plurality of sintered body blocks 201, and one end 203*a* and the other end 203*b* of the heating wire project from the sintered body blocks 201. In the heating body 20, one end 203*a* and the other end 203*b* of the heating wire are connected to an external electric power through a power feeding device, and the heating body 20 is heated by being fed with power in the above-described state.

Hitherto, the sintered body block 201 has been described to have a cubic shape, but the shape is not limited to such a shape.

Figure 7:
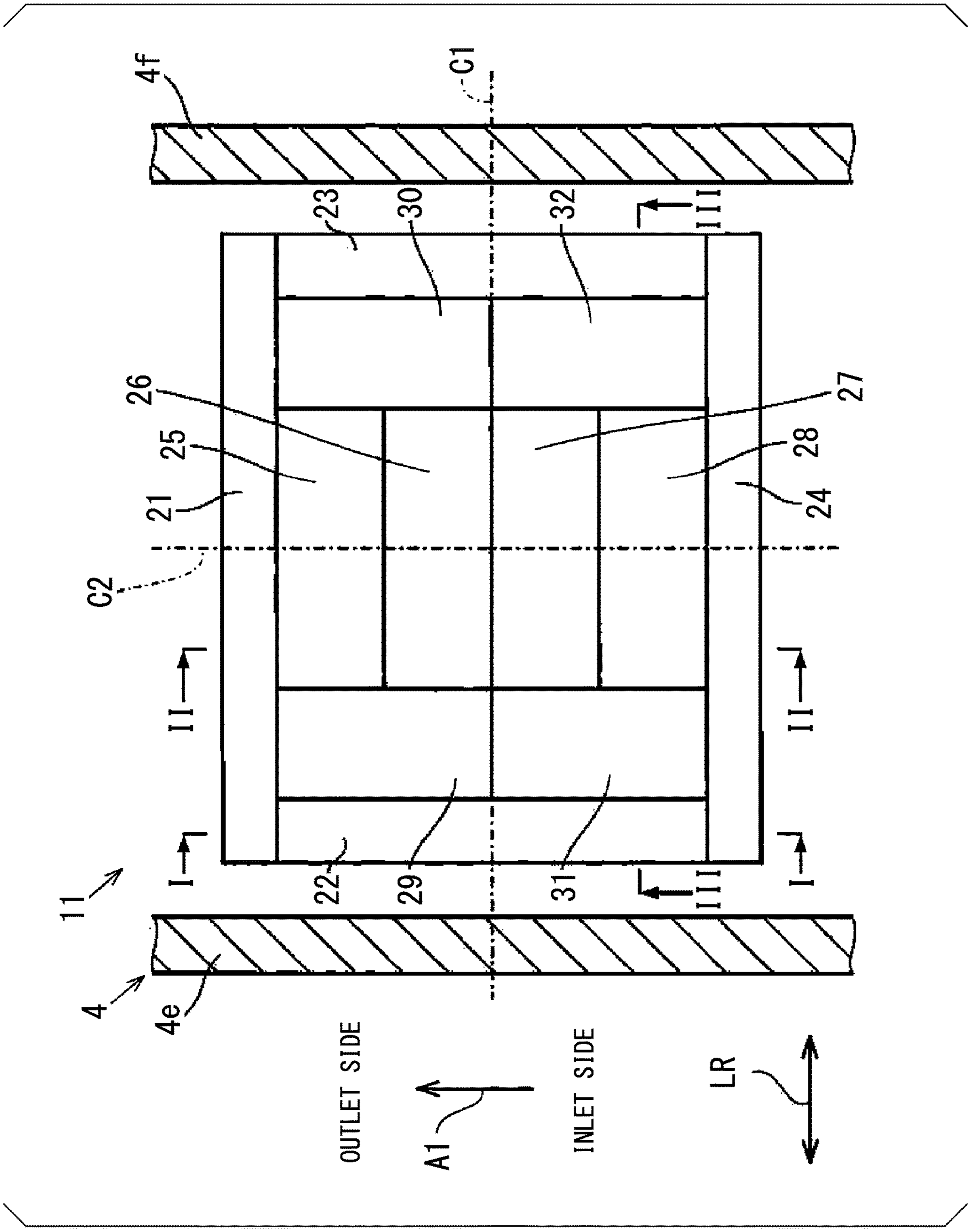
FIG. 7 is a schematic plan view showing a heater included in the heating furnace of FIG. 5.

FIG. 7 is a schematic plan view of the heater 11. In the present embodiment, as shown in FIG. 7, the heater 11 has a plurality of heating bodies 21 to 32 disposed side by side in the conveyance direction A1 and the left-right direction LR between the pair of side walls 4*e* and 4*f* of the housing 4. Other heating bodies are disposed alongside the heating bodies 25 to 32 at both end portions in the left-right direction LR, and thus the heating bodies 25 to 32 are intermediate heating bodies. That is, other heating bodies 29 and 30 are disposed alongside the heating body 25 at both end portions in the left-right direction LR. Other heating bodies 29 and 30 are disposed alongside the heating body 26 at both end portions in the left-right direction LR. Other heating bodies 31 and 32 are disposed alongside the heating body 27 at both end portions in the left-right direction LR. Other heating bodies 31 and 32 are disposed alongside the heating body 28 at both end portions in the left-right direction LR. Other heating bodies 22, 25, and 26 are disposed alongside the heating body 29 at both end portions in the left-right direction LR. Other heating bodies 23, 25, and 26 are disposed alongside the heating body 30 at both end portions in the left-right direction LR. Other heating bodies 22, 27, and 28 are disposed alongside the heating body 31 at both end portions in the left-right direction LR. Other heating bodies 23, 27, and 28 are disposed alongside the heating body 32 at both end portions in the left-right direction LR. The intermediate heating bodies are also capable of including other heating bodies 22 and 23 between the side wall 4*e* or 4*f* and themselves. In addition, feeder wires connected to a power supply are connected to the heating bodies 21 to 32 through through-holes provided in the side walls 4*e* and 4*f* to feed power.

In the present embodiment, the heating bodies 21 to 32 each have a rectangular shape in a plan view and in a bottom surface view. In addition, in the present specification, two heating bodies having the same dimensions and shape in a plan view are regarded as heating bodies of the same kind. On the other hand, two heating bodies having different dimensions or shapes in a plan view are regarded as heating bodies of different kinds. For example, in the heater 11 shown in FIG. 7, the heating body 21 and the heating body 24 have the same dimensions and shape and are thus heating bodies of the same kind. On the other hand, the heating body 21 and the heating body 25 have different dimensions and shapes and are thus heating bodies of different kinds.

Although not shown, the heater unit 5 (refer to FIG. 4) has a control device and a plurality of temperature sensors (for example, thermocouples) configured to detect the temperatures of the respective heating bodies 21 to 32. In each heater unit 5, the control device separately controls the output of the heating bodies 21 to 32 based on the temperatures of the heating bodies 21 to 32 measured with the temperature sensors. That is, in the present embodiment, the output of the plurality of heating bodies 21 to 32 is controlled independently from each other.

It should be noted that the plurality of heating bodies 21 to 32 may be integrally configured or may be configured to be separable from each other. For example, in a case where the heating bodies 21 to 32 are integrally configured, the heater 11 includes a plurality of heating wires that are provided to the heating bodies 21 to 32, respectively, and a far-infrared radiation ceramic sintered body configured to accommodate the plurality of heating wires. In addition, for example, in a case where the heating bodies 21 to 32 are configured to be separable from each other, the heater 11 includes a plurality of heating wires that are provided to the heating bodies 21 to 32, respectively, and a plurality of far-infrared radiation ceramic sintered bodies configured to accommodate the plurality of heating wires, respectively.

It should be noted that, in the heater 11, the plurality of heating bodies are preferably disposed such that at least two heating bodies having different lengths in the conveyance direction A1 are arranged in the conveyance direction A1 and two heating bodies having different lengths in the left-right direction LR are arranged in the left-right direction LR.

In the heater 11 shown in FIG. 7, for example, in a portion indicated by the I-I line, the heating body 21 and the heating body 22 that have different lengths in the conveyance direction A1 are arranged in the conveyance direction A1, and the heating body 22 and the heating body 24 that have different lengths in the conveyance direction A1 are arranged in the conveyance direction A1. In addition, for example, in a portion indicated by the II-II line, the heating body 21 and the heating body 25 that have different lengths in the conveyance direction A1 are arranged in the conveyance direction A1, and the heating body 28 and the heating body 24 that have different lengths in the conveyance direction A1 are arranged in the conveyance direction A1. Furthermore, for example, in a portion indicated by the line III-III, the heating body 22 and the heating body 31 that have different lengths in the left-right direction LR are arranged in the left-right direction LR, the heating body 31 and the heating body 28 that have different lengths in the left-right direction LR are arranged in the left-right direction LR, the heating body 28 and the heating body 32 that have different lengths in the left-right direction LR are arranged in the left-right direction LR, and the heating body 32 and the heating body 23 that have different lengths in the left-right direction LR are arranged in the left-right direction LR.

It should be noted that, in the present embodiment, the shapes, dimensions, and disposition of the heating bodies 21 to 32 are determined to exhibit a shape where the heating bodies 21 to 32 are axisymmetric with respect to a first centerline C1 that passes the center of the heating bodies 21 to 32 in the conveyance direction A1 as the target axis in a plan view. In addition, the shapes, dimensions, and disposition of the plurality of heating bodies 21 to 32 are determined to exhibit a shape where the heating bodies 21 to 32 are axisymmetric with respect to a second centerline C2 that passes the center of the heating bodies 21 to 32 in the left-right direction LR as the target axis in a plan view.

In the present embodiment, which of the heating bodies 21 to 32 to be used to heat the workpiece 10 are selected based on the dimensions and shape of the workpiece 10. For example, as shown in FIG. 8(*a*), in a case where the workpiece 10 is almost as large as the heater 11 in a plan view, the workpiece 10 is heated using all of the heating bodies 21 to 32.

Figure 8:
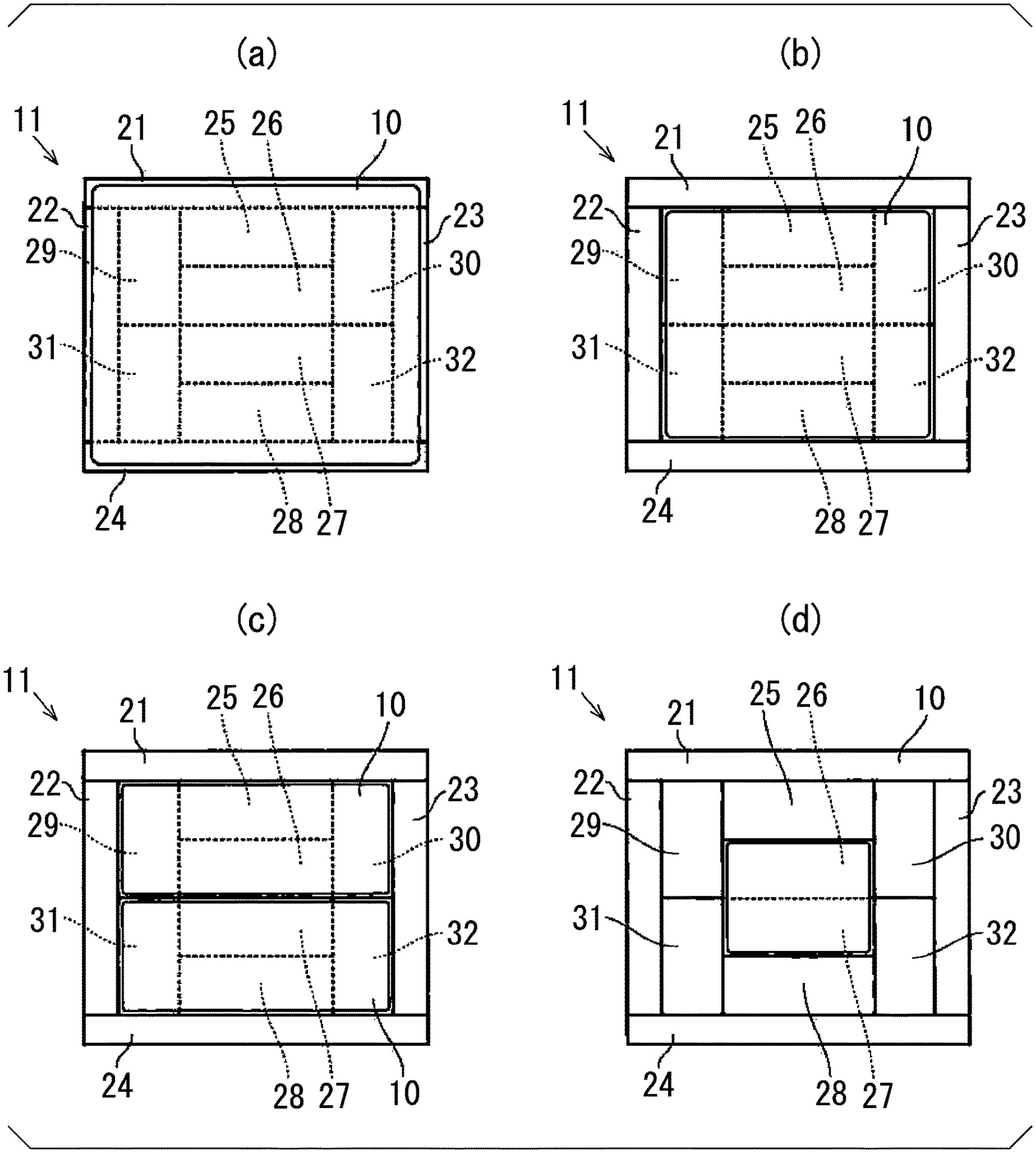
FIG. 8 is a view for explaining a method for heating a workpiece with the heater of FIG. 7.

For example, in a case where the workpiece 10 has a shape shown in FIG. 8(*b*), the workpiece 10 is heated using the heating bodies 25 to 32. In this case, it is possible to stop the output of, for example, the heating bodies 21 to 24. That is, in the example shown in FIG. 8(*b*), the workpiece 10 is heated only with the heating bodies 25 to 32.

For example, in a case where the workpiece 10 has a shape shown in FIG. 8(*c*), it is possible to heat two workpieces 10 at the same time. Specifically, it is possible to heat the workpiece 10 on the outlet side of the heating furnace 2 (refer to FIG. 4) with the heating bodies 25, 26, 29, and 30 and to heat the workpiece 10 on the inlet side of the heating furnace 2 with the heating bodies 27, 28, 31, and 32. In this case as well, similar to the case of FIG. 8(*b*), it is possible to stop the output of the heating bodies 21 to 24. It should be noted that, in the example shown in FIG. 8(*c*), when the heating of the workpiece 10 on the outlet side of the heating furnace 2 is completed, the workpiece 10 is unloaded from the heating furnace 2. In addition, the workpiece 10 on the inlet side of the heating furnace 2 is moved to the outlet side, a new workpiece 10 is loaded into the inlet side of the heating furnace 2, and these workpieces 10 are heated at the same time.

For example, in a case where the workpiece 10 has a shape shown in FIG. 8(*d*), the workpiece 10 is heated using the heating bodies 26 and 27. In this case, it is possible to stop the output of, for example, the heating bodies 21 to 25 and 28 to 32. That is, in the example shown in FIG. 8(*d*), the workpiece 10 is heated only with the heating bodies 26 and 27. It should be noted that, similar to FIG. 8(*c*), two workpieces 10 shown in FIG. 8(*d*) may be heated at the same time. In this case, one workpiece 10 is heated with the heating bodies 25 and 26, and the other workpiece 10 is heated with the heating bodies 27 and 28.

(Effect of the Present Embodiment)

As described above, in the heating furnace 2 according to the present embodiment, it is possible to heat the workpiece 10 using, out of the heating bodies 21 to 32, only the heating bodies that overlap the workpiece 10 in a plan view. In this case, since it is possible to stop the output of, out of the heating bodies 21 to 32, the heating bodies that do not overlap the workpiece 10 in a plan view, the workpiece 10 can be efficiently heated.

In addition, in the present embodiment, the heater 11 is configured by combining a plurality of heating bodies having different dimensions or shapes. Therefore, an appropriate heating body is selected according to the dimensions and shape of the workpiece 10, whereby it is possible to sufficiently decrease the area of a portion of the heating body in operation that does not overlap the workpiece 10 in a plan view. In a case where the area of the portion of the heating body in operation that does not overlap the workpiece 10 is sufficiently small as described above, heat is also sufficiently released from the portion due to the workpiece 10. Therefore, it is possible to sufficiently reduce energy that is consumed during the heating of the workpiece 10. In addition, it is possible to prevent the temperature of the portion of the heating body in operation that does not overlap the workpiece 10 in a plan view from becoming too high. As a result, it is possible to uniformly heat the entire workpiece 10.

In addition, with the heater 11 according to the present embodiment, compared with a case where a heater is made up of a plurality of heating bodies having the same shape and dimensions, it is possible to appropriately heat workpieces having a variety of dimensions and shapes while suppressing an increase in the number of heating bodies. Therefore, it is possible to suppress an increase in the manufacturing cost of the heater 11 and to suppress the manufacturing cost of the heating furnace 2.

As described above, according to the present embodiment, it becomes possible to appropriately heat workpieces having a variety of dimensions and shapes while suppressing an increase in the manufacturing cost of the heating furnace 2.

(Configuration of Power Feeding Device)

Figure 9:
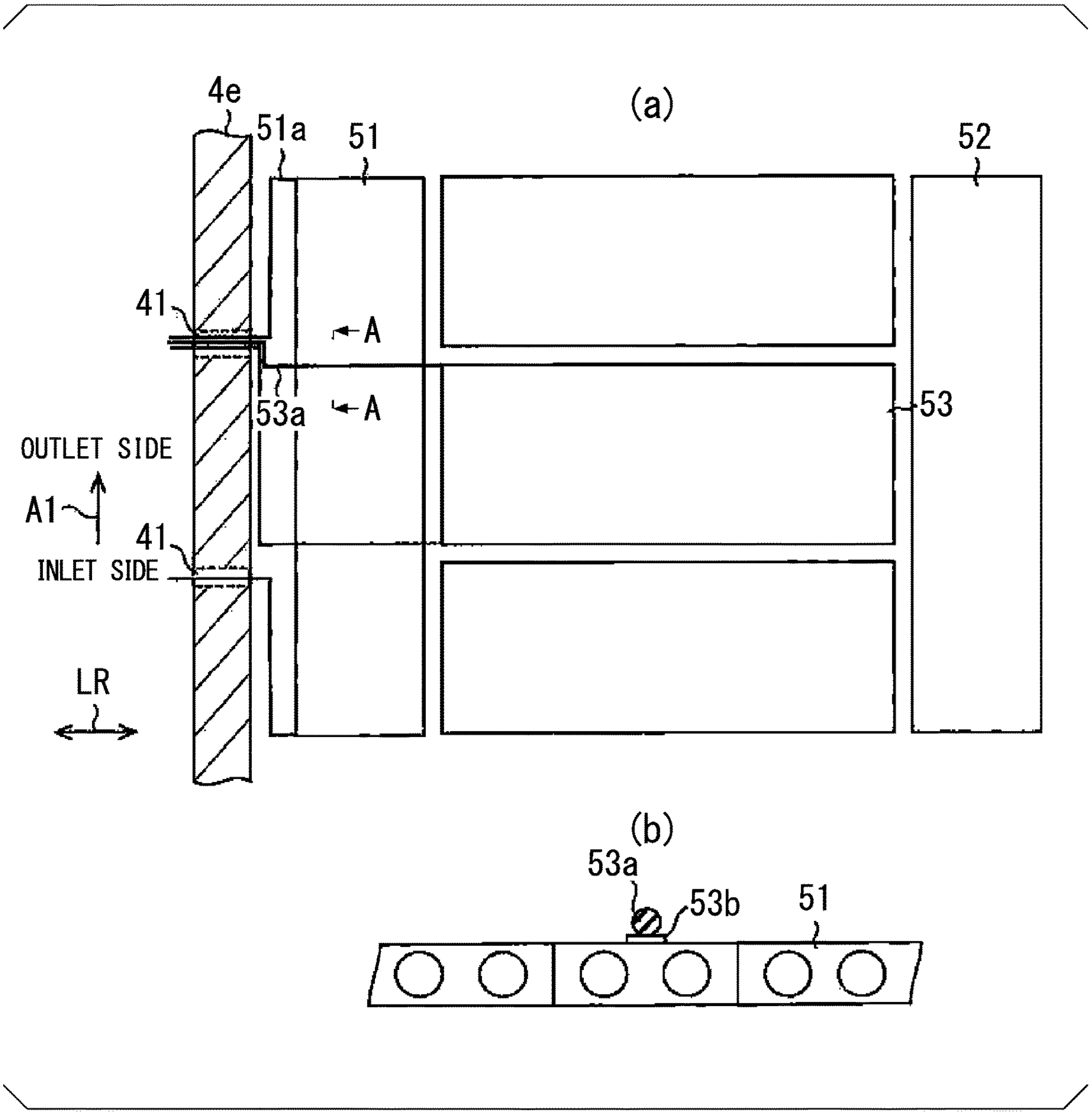
FIG. 9 is a view showing an example of the configuration of a power feeding device.

FIG. 9 shows views of an example of the configuration of the power feeding device. FIG. 9(*a*) is a partial plan view showing the scheme of the configuration of the power feeding device, and FIG. 9(*b*) is a cross-sectional view taken along the line A-A in FIG. 9(*a*).

Figure 10:
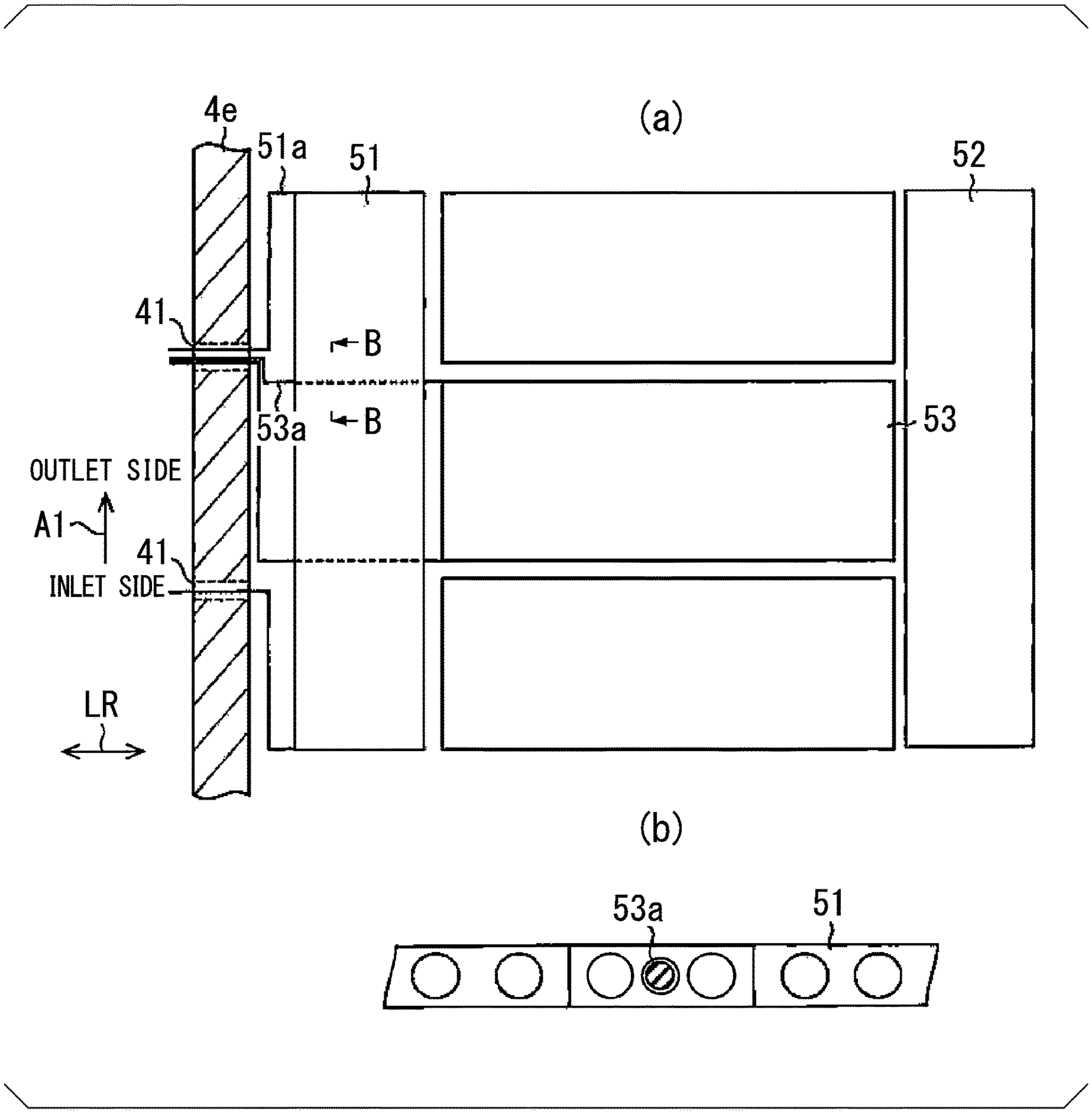
FIG. 10 is a view showing a different example of the configuration of the power feeding device.

FIG. 10 shows views of an example of the configuration of the power feeding device. FIG. 10(*a*) is a partial plan view showing the scheme of the configuration of the power feeding device, and FIG. 10(*b*) is a cross-sectional view taken along the line B-B in FIG. 10(*a*).

Figure 11:
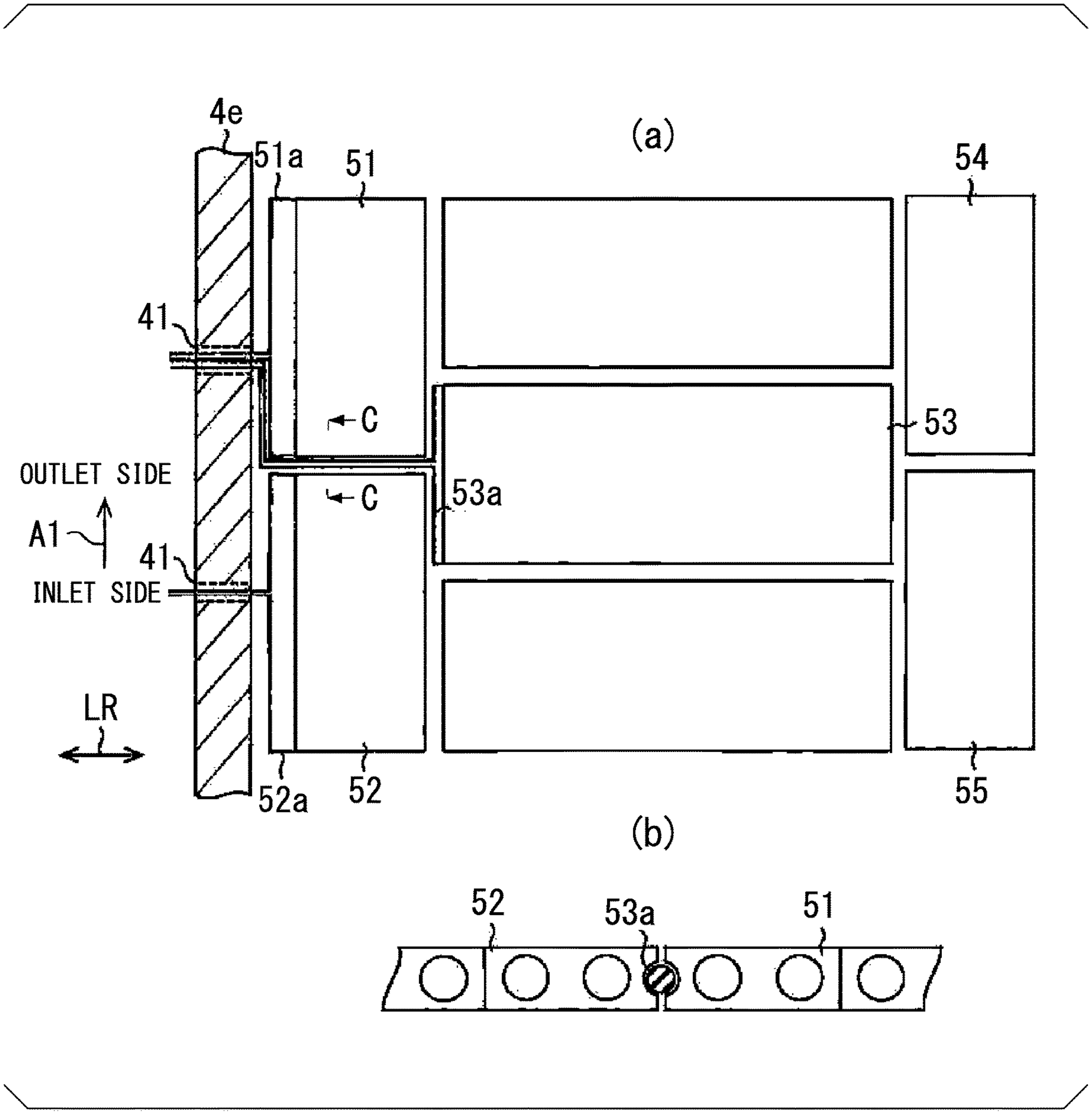
FIG. 11 is a view showing a different example of the configuration of the power feeding device.

FIG. 11 shows views of an example of the configuration of the power feeding device. FIG. 11(*a*) is a partial plan view showing the scheme of the configuration of the power feeding device, and FIG. 11(*b*) is a cross-sectional view taken along the line C-C in FIG. 11(*a*).

As shown in FIG. 9, FIG. 10, and FIG. 11, the side wall 4*e* is provided with through-holes 41 for inserting feeder wires 51*a*, 52*a*, and 53*a* that are connected to an external electric power (not shown). The feeder wires 51*a*, 52*a*, and 53*a* are each covered with, for example, an insulating coating. In addition, the feeder wires 51*a* and 52*a* for heating bodies 51 and 52 disposed near the side wall 4*e* are directly wired to the through-holes 41 to configure the respective feeding units. Therefore, the feeding units each include the feeder wire for the heating body and the insulating coating.

As shown in FIG. 9, the other heating bodies 51 and 52 are disposed alongside the heating body 53 at both end portions in the left-right direction LR. Hereinafter, such a heating body 53 will be referred to as the intermediate heating body 53. It is also possible for the other heating body 51 to be present between the intermediate heating body 53 and the side wall 4*e*. The feeder wire 53*a* for the intermediate heating body 53 is disposed on the surface of the other heating body 51 through an insulator 53*b* to configure the feeding unit. At this time, as the feeder wire 53*a*, used is a feeder wire covered with a heat-resistant material such as a sintered body on the surface. This disposition is the simplest. However, there is a concern that the heating efficiency of the other heating body 51 may be decreased.

As shown in FIG. 10, the other heating bodies 51 and 52 are disposed alongside the intermediate heating body 53 at both end portions in the left-right direction LR. It is also possible for the other heating body 51 to be present between the intermediate heating body 53 and the side wall 4*e*. The feeder wire 53*a* for the intermediate heating body 53 is disposed inside the other heating body 51 to configure the feeding unit. At this time, it is necessary to prevent the feeder wire 53*a* from electrically coming into contact with the heating wire for the other heating body 51 inside the other heating body 51. Therefore, as the feeder wire 53*a*, used is a feeder wire covered with an insulating material on the surface. This disposition is excellent in terms of the fact that there is no problem with the heating efficiency of the other heating body 51. However, in the case of the failure of the intermediate heating body 53, it becomes necessary to replace the other heating body 51 as well.

As shown in FIG. 11, the other heating bodies 51, 52, 54, and 55 are disposed alongside the intermediate heating body 53 at both end portions in the left-right direction LR. It is also possible for the other heating body 51 to be present between the intermediate heating body 53 and the side wall 4*e*. The feeder wire 53*a* for the intermediate heating body 53 is disposed between the other heating body 51 and the heating body 52 to configure the feeding unit. At this time, for example, the heating body 51 and the heating body 52 are provided with notches on the side surfaces facing each other, and the feeder wire 53*a* is disposed in the notches. The notch shown in the drawing has a semicircular shape in a cross-sectional view perpendicular to the axis of the through-hole, but the shape is not limited thereto. In addition, in a case where there is a sufficient gap between the heating body 51 and the heating body 52, the notch may not be provided. When the feeder wire 53*a* is disposed as described above, there is no problem with the heating efficiency of the other heating body 51, and the replacement of the intermediate heating body 53 alone is possible. Therefore, the installation workability is also favorable.

As described above, the heating bodies are connected to an external electric power through the respective feeding units. It is also conceivable to hang the feeder wire 53*a* for the intermediate heating body 53 below the other heating body and guide the feeder wire 53*a* to the through-hole 41 in the side wall 4*e* or 4*f*, but this method creates a need for opening holes in the heater support materials 12, which is difficult to perform.

OTHER EMBODIMENTS

In the above-described embodiment, the case where the heater 11 has 12 heating bodies 21 to 32 has been described, but the number of the heating bodies and the dimensions and shapes of the heating bodies are not limited to the above-described examples.

Figure 12:
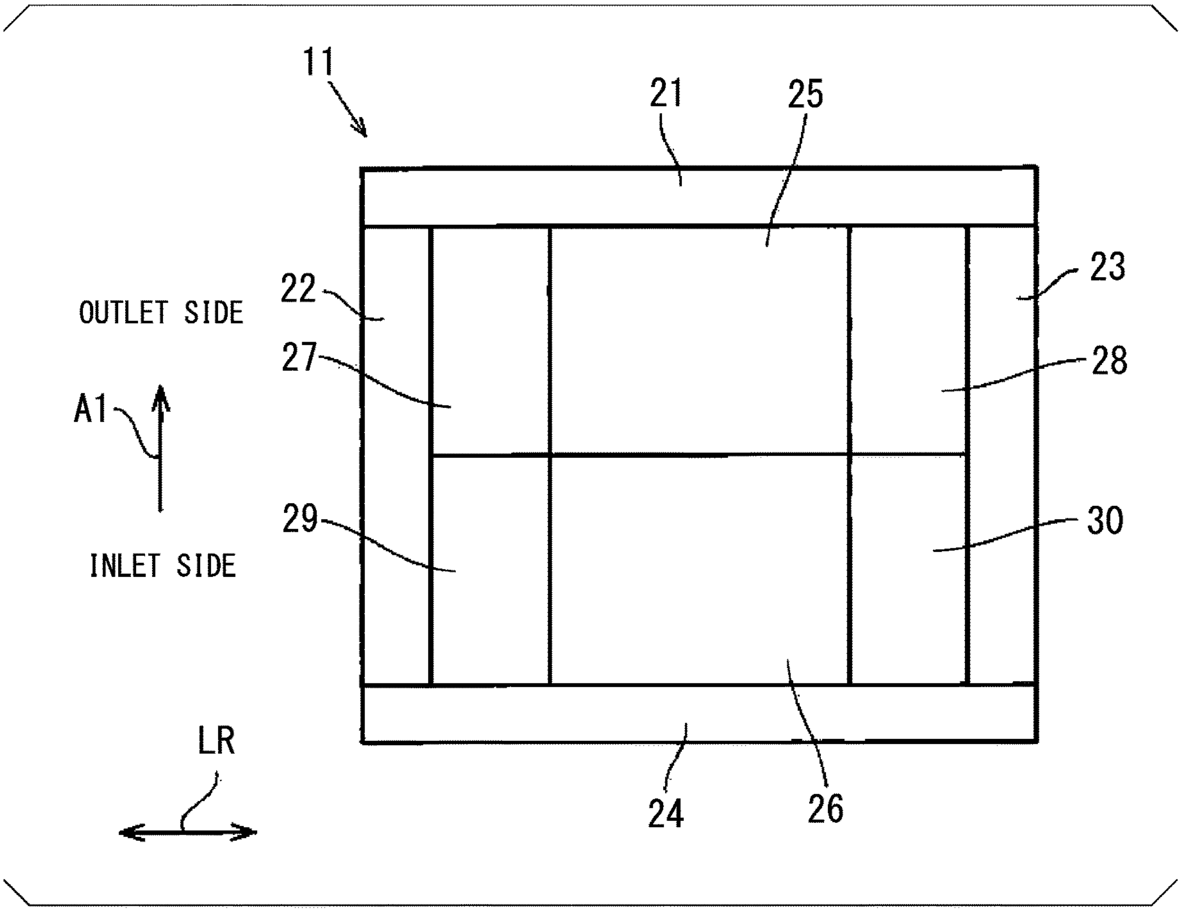
FIG. 12 is a view showing a different example of the heater.
Figure 13:
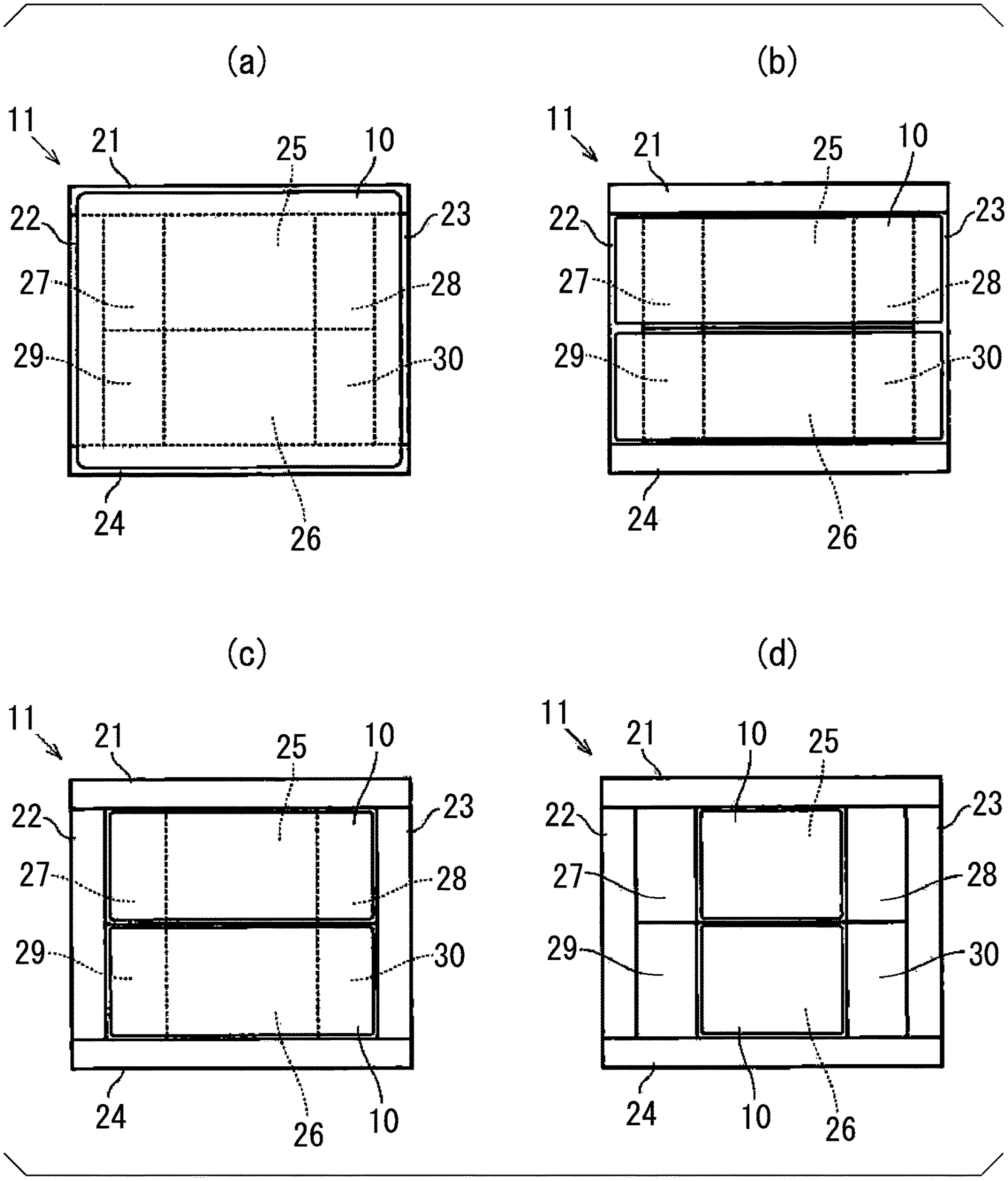
FIG. 13 is a view for describing a method for heating a workpiece with the heater of FIG. 12.

For example, the heater 11 may be made up of 10 heating bodies 21 to 30 as shown in FIG. 12. Even in the case of using the heater 11 shown in FIG. 12, an appropriate heating body is selected to heat the workpiece 10 according to the dimensions and shape of the workpiece 10 as shown in FIG. 13(*a*) to FIG. 13(*d*), whereby the same action and effect as those of the above-described embodiment can be obtained. In FIG. 12 and FIG. 13, the intermediate heating bodies are the heating bodies 25, 26, 27, 28, 29, and 30.

It should be noted that, in the example shown in FIG. 13(*a*), the workpiece 10 is heated with all of the heating bodies 21 to 30. In addition, in the example shown in FIG. 13(*b*), between the two workpieces 10, one workpiece 10 is heated with the heating bodies 22, 23, 25, 27, and 28, and the other workpiece 10 is heated with the heating bodies 22, 23, 26, 29, and 30. In this case, it is possible to stop the output of the other heating bodies 21 and 24. In addition, in the example shown in FIG. 13(*c*), between the two workpieces 10, one workpiece 10 is heated only with the heating bodies 25, 27, and 28, and the other workpiece 10 is heated only with the heating bodies 26, 29, and 30. In the example shown in FIG. 13(*d*), between the two workpieces 10, one workpiece 10 is heated only with the heating body 25, and the other workpiece 10 is heated only with the heating body 26.

Figure 14:
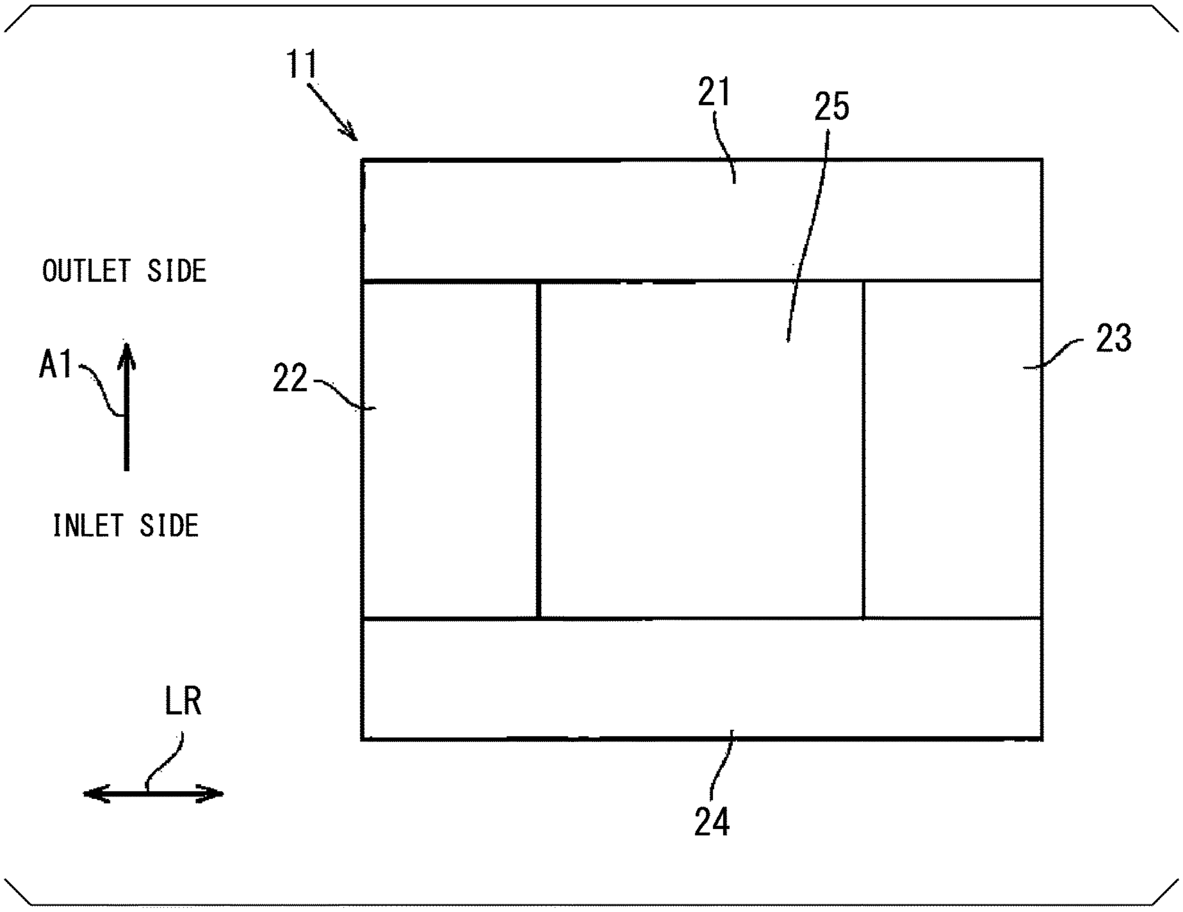
FIG. 14 is a view showing a different example of the heater.
Figure 15:
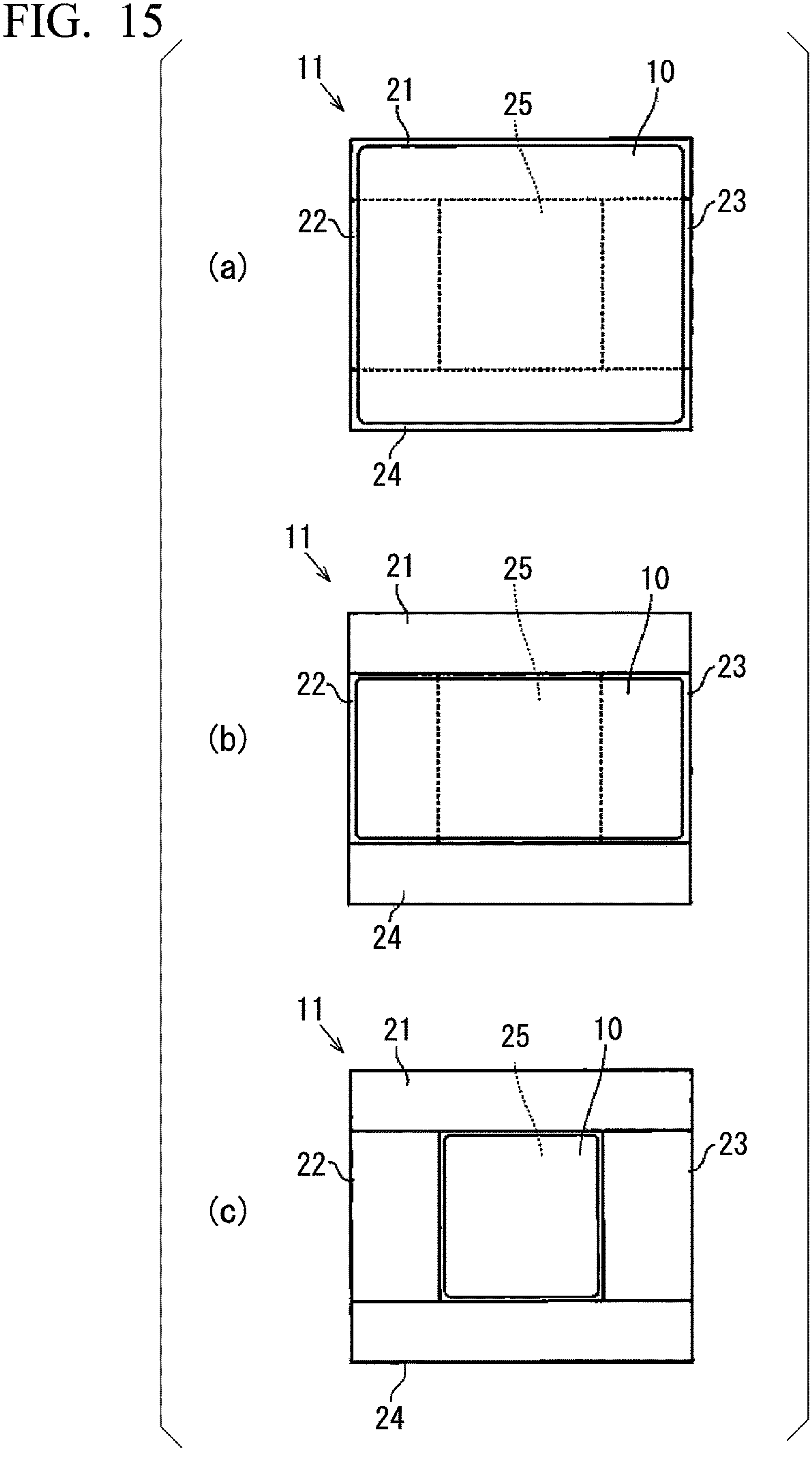
FIG. 15 is a view for describing a method for heating a workpiece with the heater of FIG. 14.

In addition, for example, the heater 11 may be made up of five heating bodies 21 to 25 as shown in FIG. 14. Even in the case of using the heater 11 shown in FIG. 14, an appropriate heating body is selected to heat the workpiece 10 according to the dimensions and shape of the workpiece 10 as shown in FIG. 15(*a*) to FIG. 15(*c*), whereby the same action and effect as those of the above-described embodiment can be obtained. In FIG. 14 and FIG. 15, the intermediate heating body is the heating body 25.

It should be noted that, in the example shown in FIG. 15(*a*), the workpiece 10 is heated with all of the heating bodies 21 to 25, in the example shown in FIG. 15(*b*), the workpiece 10 is heated only with the heating bodies 22, 23, and 25, and, in the example shown in FIG. 15(*c*), the workpiece 10 is heated only with the heating body 25.

Figure 16:
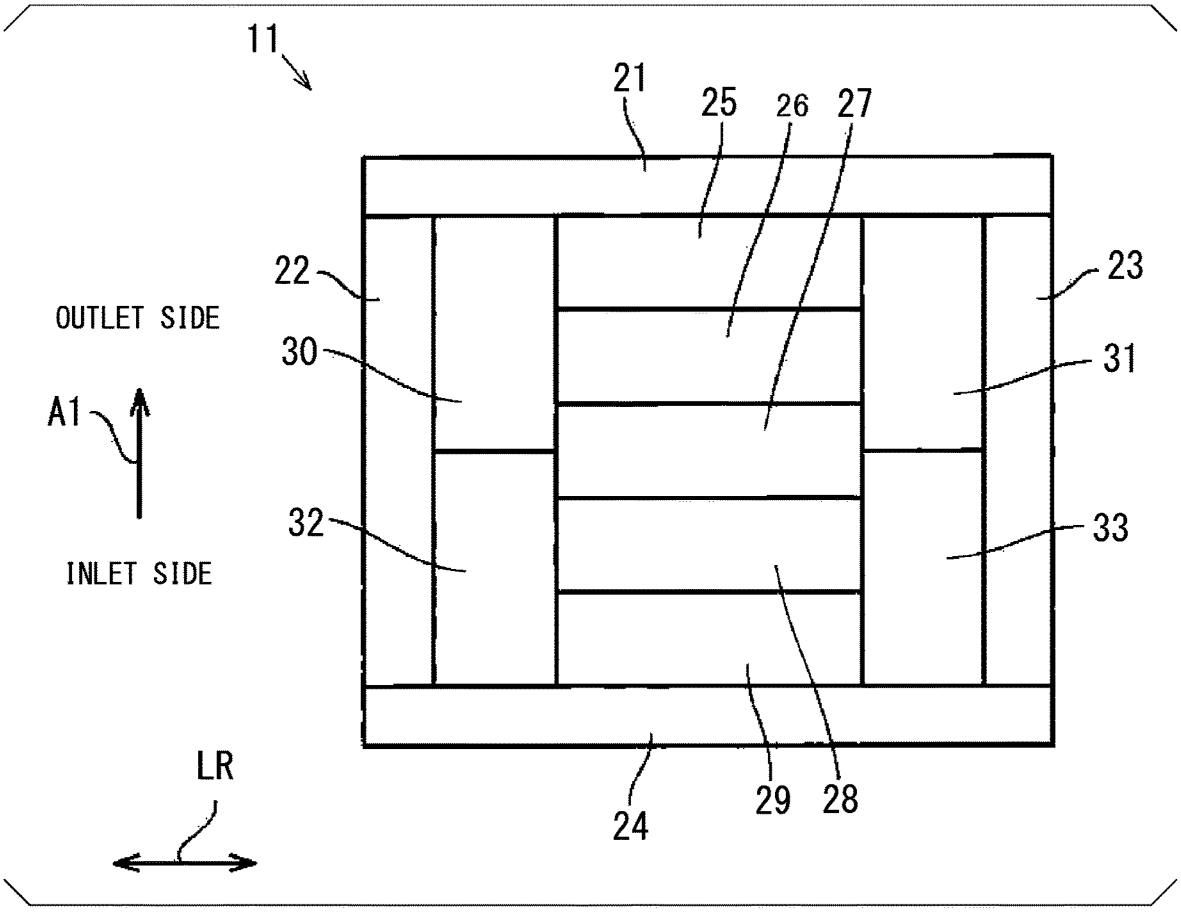
FIG. 16 is a view showing a different example of the heater.
Figure 17:
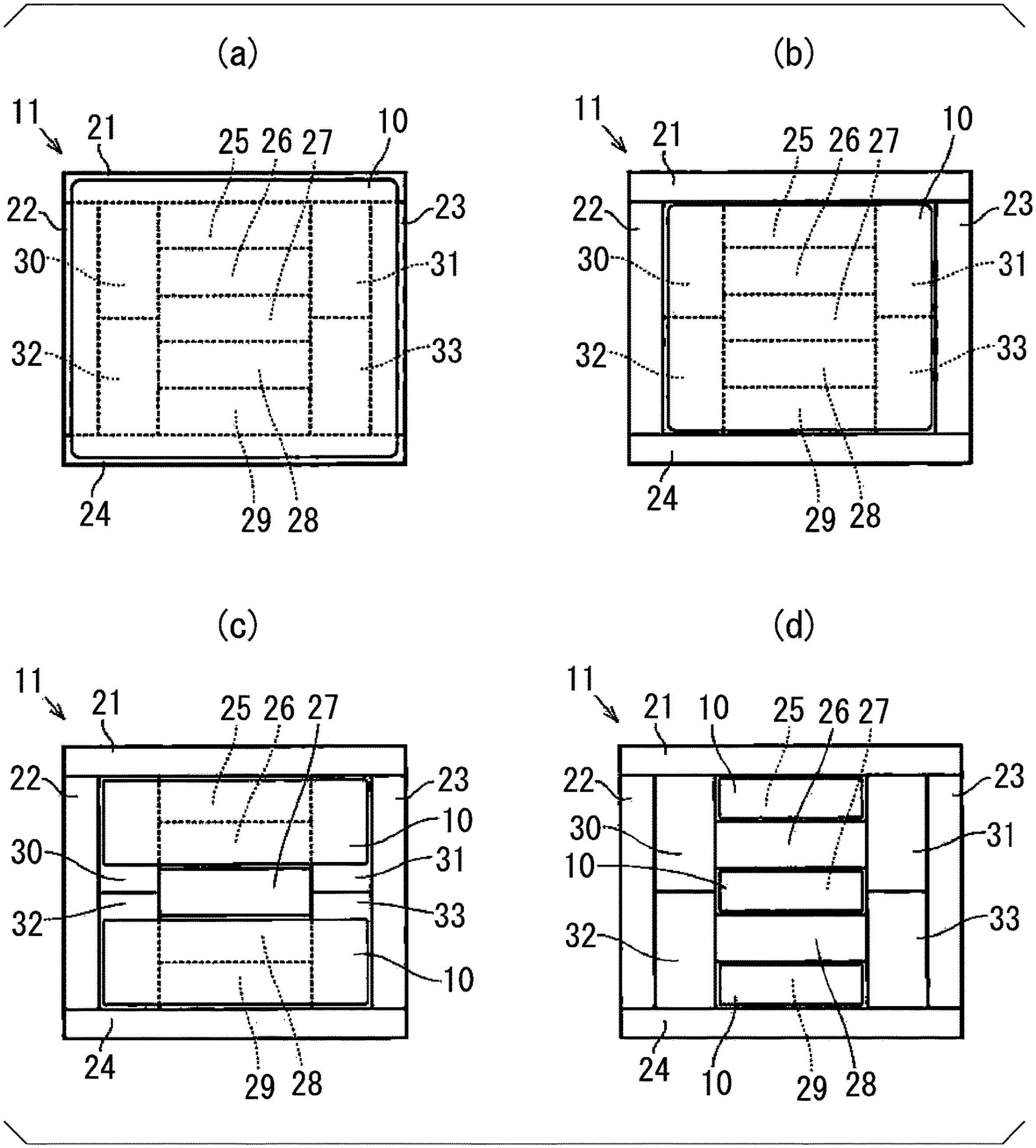
FIG. 17 is a view for describing a method for heating a workpiece with the heater of FIG. 16.

In addition, for example, the heater 11 may be made up of 13 heating bodies 21 to 33 as shown in FIG. 16. Even in the case of using the heater 11 shown in FIG. 16, an appropriate heating body is selected to heat the workpiece 10 according to the dimensions and shape of the workpiece 10 as shown in FIG. 17(*a*) to FIG. 17(*d*), whereby the same action and effect as those of the above-described embodiment can be obtained. In FIG. 16 and FIG. 17, the intermediate heating bodies are the heating bodies 25, 26, 27, 28, 29, 30, 31, 32, and 33.

It should be noted that, in the example shown in FIG. 17(*a*), the workpiece 10 is heated with all of the heating bodies 21 to 33, and, in the example shown in FIG. 17(*b*), the workpiece 10 is heated only with the heating bodies 25 to 33. In addition, in the example shown in FIG. 17(*c*), between the two workpieces 10, one workpiece 10 is heated only with the heating bodies 25, 26, 30, and 31, and the other workpiece 10 is heated only with the heating bodies 28, 29, 32, and 33. In addition, in the example shown in FIG. 17(*d*), among the three workpieces 10, one workpiece 10 is heated only with the heating body 25, another workpiece 10 is heated only with the heating body 27, and the other workpiece 10 is heated only with the heating body 29.

Figure 18:
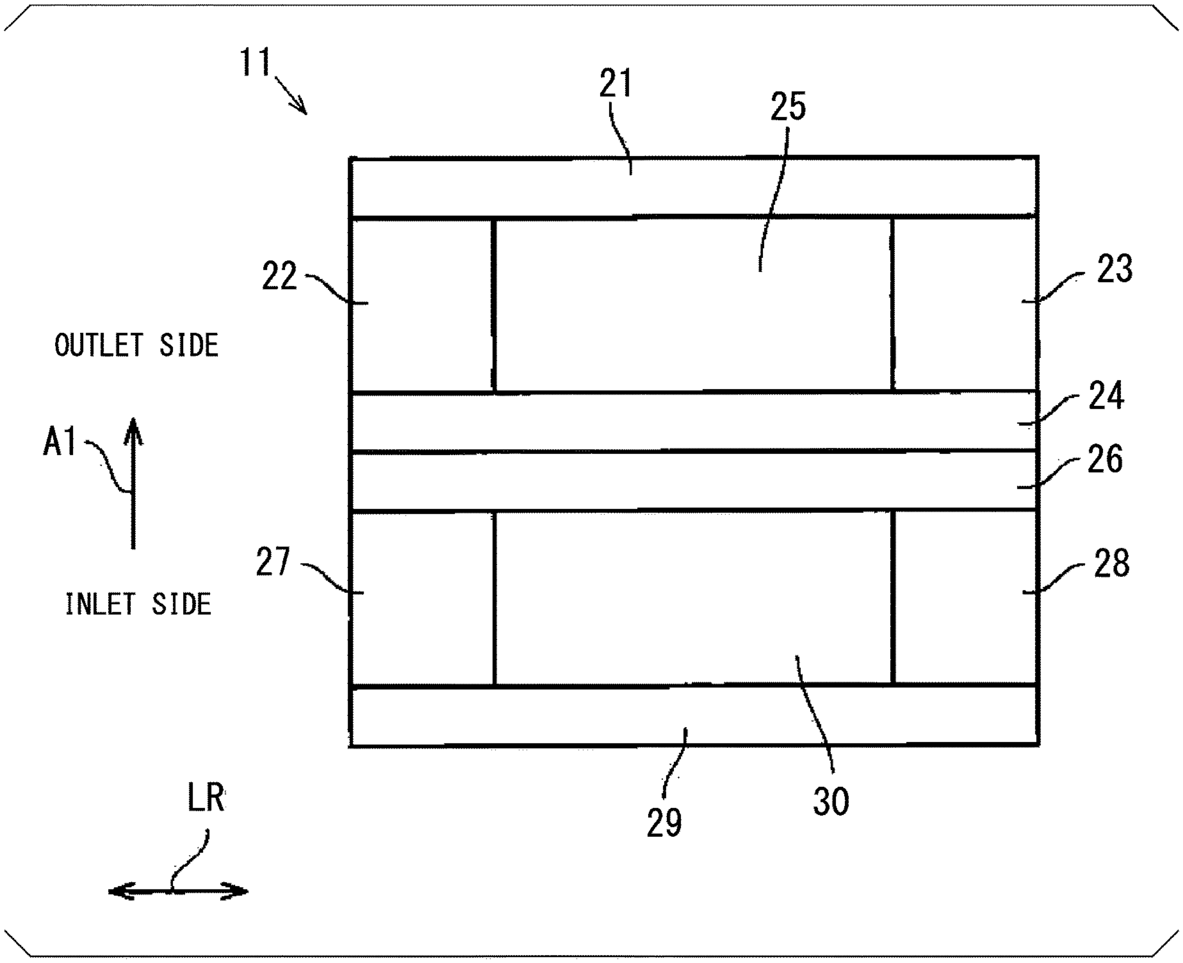
FIG. 18 is a view showing a different example of the heater.
Figure 19:
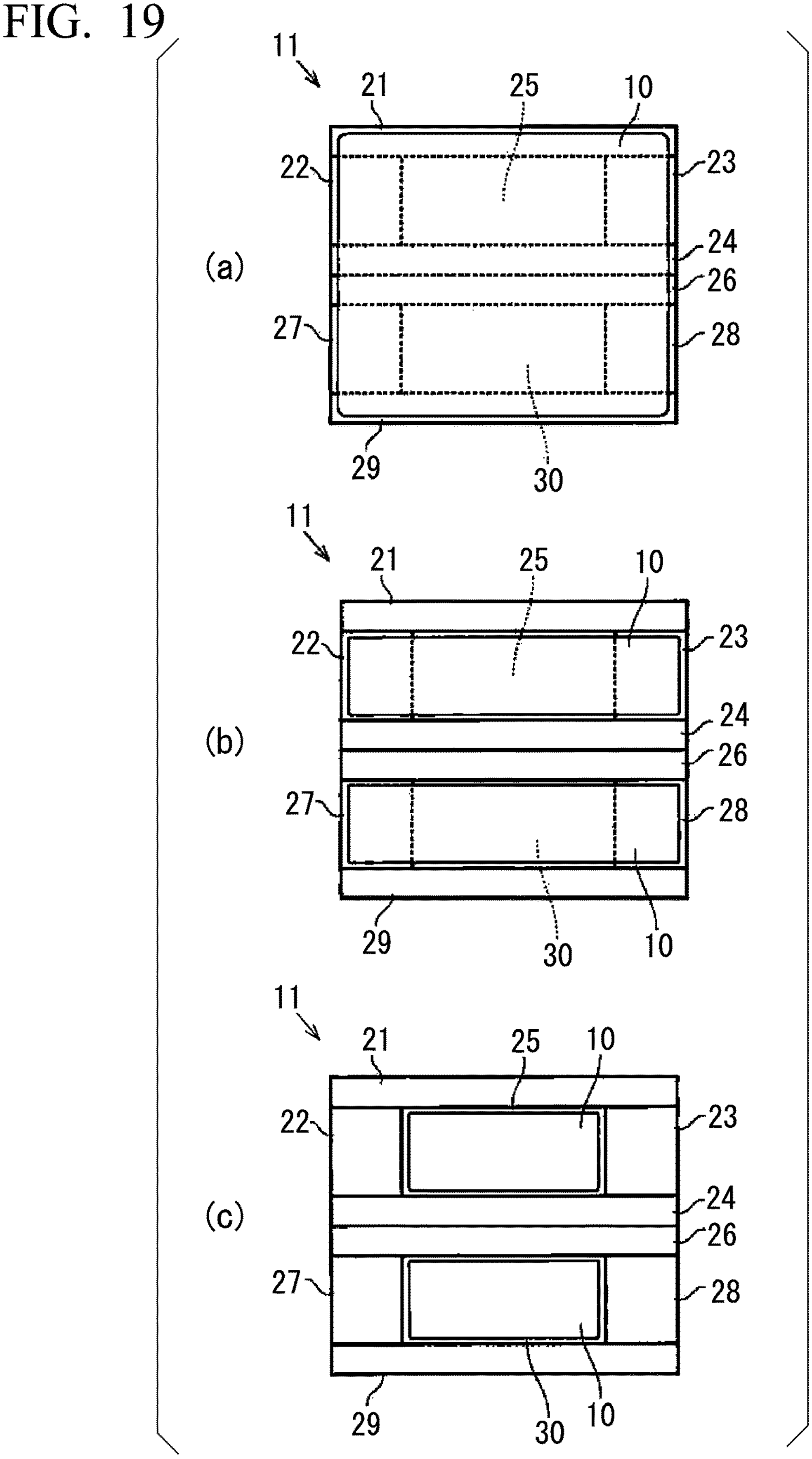
FIG. 19 is a view for describing a method for heating a workpiece with the heater of FIG. 18.

In addition, for example, the heater 11 may be made up of 10 heating bodies 21 to 30 as shown in FIG. 18. Even in the case of using the heater 11 shown in FIG. 18, an appropriate heating body is selected to heat the workpiece 10 according to the dimensions and shape of the workpiece 10 as shown in FIG. 19(*a*) to FIG. 19(*c*), whereby the same action and effect as those of the above-described embodiment can be obtained. In FIG. 18 and FIG. 19, the intermediate heating bodies are the heating bodies 25 and 30.

It should be noted that, in the example shown in FIG. 19(*a*), the workpiece 10 is heated with all of the heating bodies 21 to 30. In addition, in the example shown in FIG. 19(*b*), between the two workpieces 10, one workpiece 10 is heated only with the heating bodies 22, 23, and 25, and the other workpiece 10 is heated only with the heating bodies 27, 28, and 30. In the example shown in FIG. 19(*c*), between the two workpieces 10, one workpiece 10 is heated only with the heating body 25, and the other workpiece 10 is heated only with the heating body 30.

It should be noted that the method for heating the workpiece 10 using the heater 11 according to the present invention is not limited to the method described using FIG. 7 to FIG. 19. The workpiece 10 simply needs to be heated by selecting an appropriate heating body from a plurality of heating bodies according to the dimensions and shape of the workpiece 10.

Figure 20:
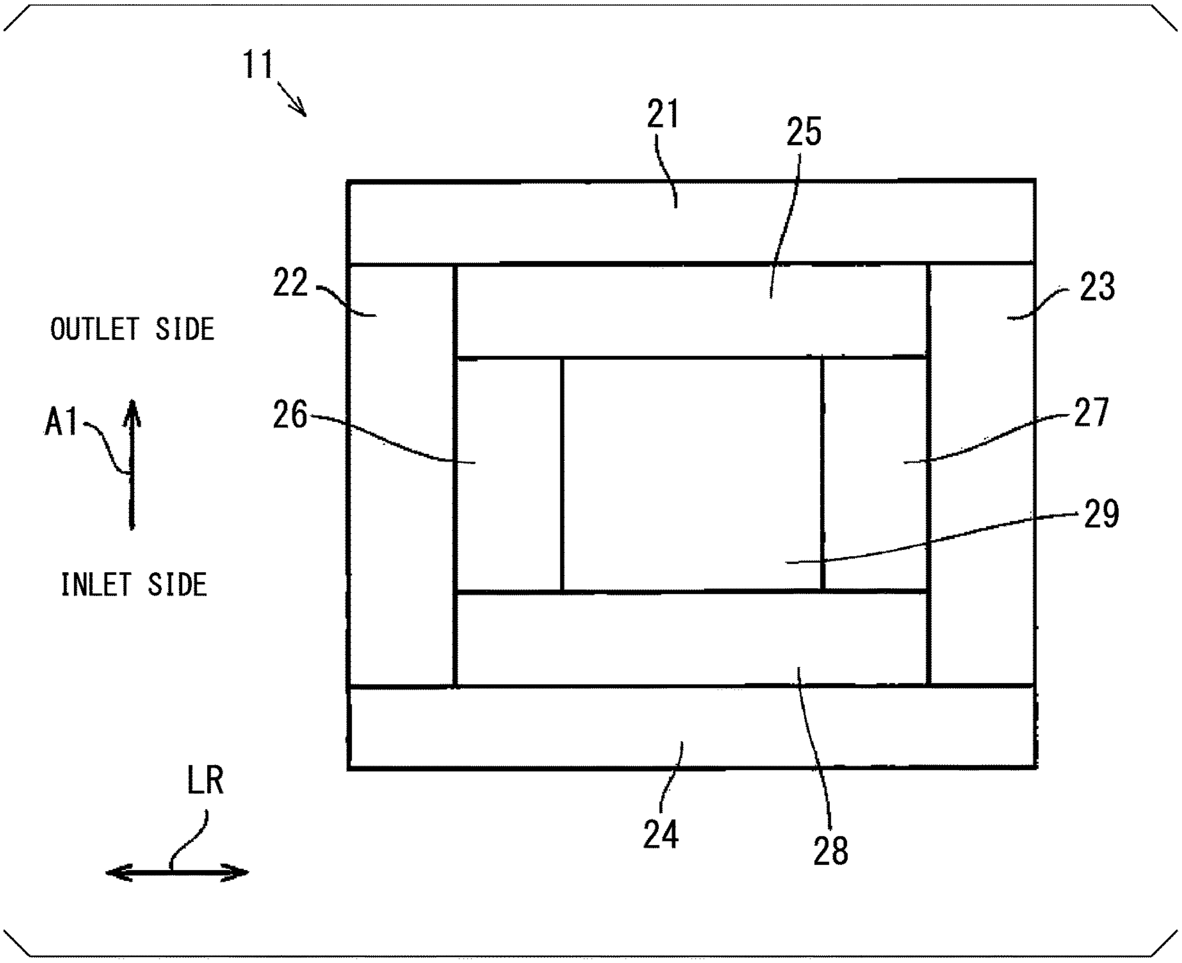
FIG. 20 is a view showing a different example of the heater.
Figure 21:
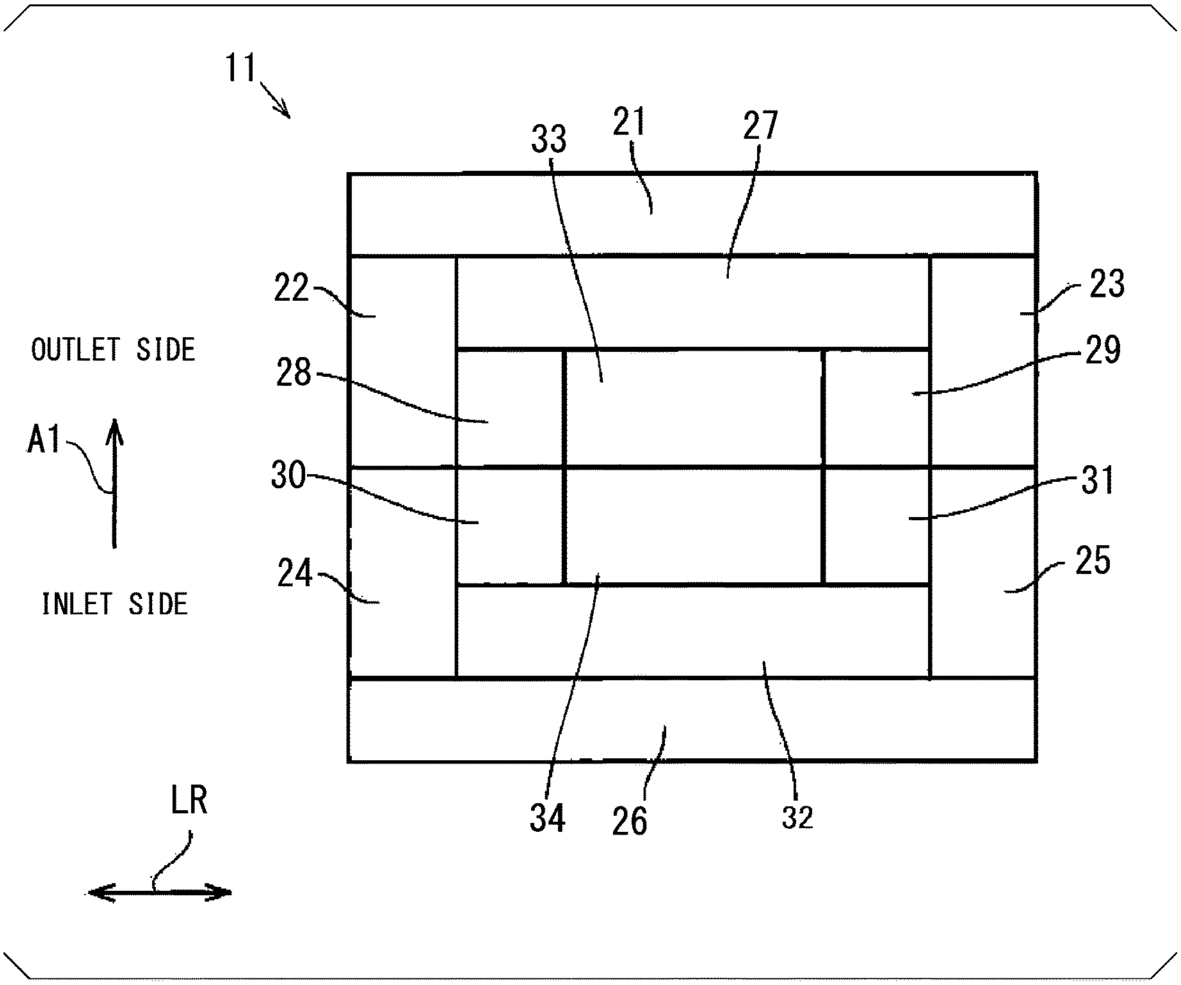
FIG. 21 is a view showing a different example of the heater.

In addition, the configuration of the heater 11 is also not limited to the above-described examples, and the heater 11 simply needs to include two or more kinds of heating bodies having different dimensions or shapes. Therefore, although not described in detail, the heater 11 may be made up of nine heating bodies 21 to 29 disposed as shown in FIG. 20 or may be made up of 14 heating bodies 21 to 34 disposed as shown in FIG. 21. In FIG. 20, the intermediate heating bodies are the heating bodies 25, 26, 27, 28, and 29, and, in FIG. 21, the intermediate heating bodies are the heating bodies 27, 28, 29, 30, 31, 32, 33, and 34.

Figure 22:
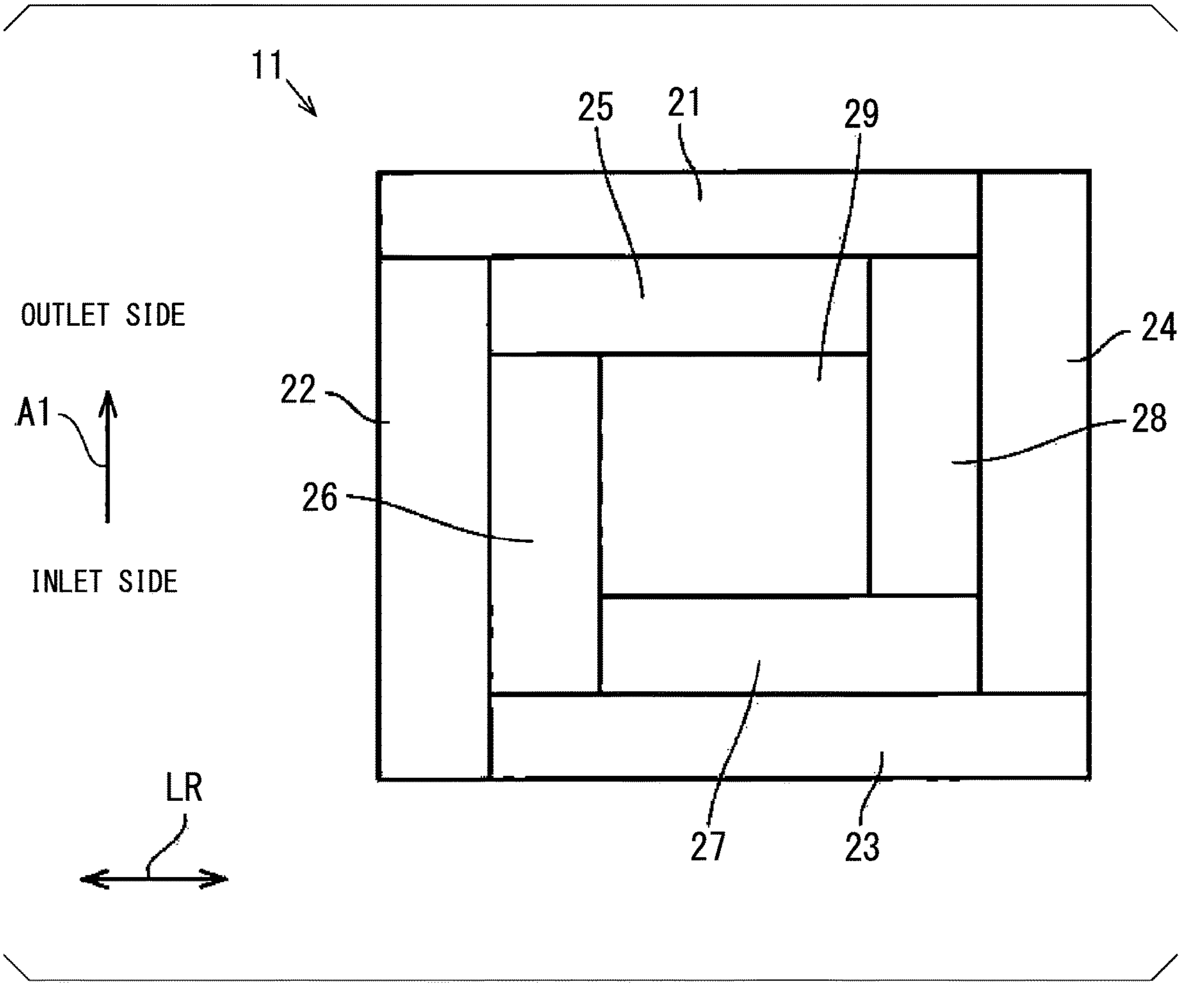
FIG. 22 is a view showing a different example of the heater.

It should be noted that, in the above-described embodiment, the case where the plurality of heating bodies are disposed to exhibit a shape where the plurality of heating bodies are axisymmetric with respect to the first centerline that passes the center of the plurality of heating bodies and extends in the left-right direction LR as the target axis in a plan view and to exhibit a shape where the plurality of heating bodies are axisymmetric with respect to the second centerline that passes the center of the plurality of heating bodies and extends in the conveyance direction A1 as the target axis in a plan view. However, the plurality of heating bodies may not be disposed to be axisymmetric as described above. For example, as in the heater 11 shown in FIG. 22, a plurality of heating bodies 21 to 28 may be disposed to exhibit a shape where the heating bodies 21 to 28 are point-symmetric with respect to the center of the heating bodies 21 to 28 as the target point. It should be noted that, in the heater 11 shown in FIG. 22, the plurality of heating bodies are disposed such that the lengths of the heating bodies become longer as the heating bodies are positioned outside. In FIG. 22, the intermediate heating bodies are the heating bodies 25, 26, 27, 28, and 29.

It should be noted that, in the above-described embodiment, the case where each heating body has a rectangular shape has been described, but the shape of the heating body is not limited to the above-described example. For example, in a plan view, the heating body may have a different shape such as an L shape or a T shape. In addition, in the above-described embodiment, the case where the heat treatment of the workpiece 10 having a substantially rectangular shape has been described, but the shape of the workpiece is not limited to the above-described example, and the heating furnace according to the present invention is capable of performing the heat treatment of workpieces having a variety of shapes such as a polygonal shape, a circular shape, and an elliptical shape.

INDUSTRIAL APPLICABILITY

According to the present invention, it becomes possible to appropriately heat workpieces having a variety of dimensions and shapes while suppressing an increase in the manufacturing cost of heating furnaces.

BRIEF DESCRIPTION OF THE REFERENCE SYMBOLS

1 Heat treatment device
2 Heating furnace
**3*a*** Workpiece loading device
**3*b*** Workpiece unloading device
10 Workpiece
11 Heater

12 Heater support material
13 Workpiece support material
21 to 33 Heating body
4*e*, 4*f* Side wall
41 Through-hole
51 to 55 Heating body
51*a* to 53*a* Feeder wire

The invention claimed is:

1. A heating furnace comprising:
a housing having a pair of side walls;
a workpiece support material configured to support a workpiece having a flat plate shape in a horizontal posture between the pair of side walls;
a planar heater configured to heat the workpiece supported by the workpiece support material from above or below;
a power feeding device configured to feed power to the planar heater; and
a heater support material configured to support the planar heater in a horizontal posture,
wherein the planar heater has a plurality of heating bodies disposed side by side in a conveyance direction and in a left-right direction orthogonal to the conveyance direction in a plan view,
the plurality of heating bodies each have a heating wire and a sintered body configured to accommodate the heating wire, include two or more kinds of heating bodies having different dimensions or shapes, and include an intermediate heating body alongside which other heating bodies are disposed at both end portions in the left-right direction,
the power feeding device has a feeding unit configured to feed power to each of the heating bodies from the side wall, and
in the feeding unit, a feeder wire configured to feed power to the intermediate heating body alongside which other heating bodies are disposed at both end portions is disposed on a surface of the other heating body.

2. The heating furnace according to claim 1,
wherein, in the planar heater, the plurality of heating bodies are disposed such that at least two heating bodies having different lengths in the conveyance direction are arranged in the conveyance direction and two heating bodies having different lengths in the left-right direction are arranged in the left-right direction.

3. The heating furnace according to claim 1,
wherein the plurality of heating bodies are disposed to exhibit a shape where the plurality of heating bodies are axisymmetric with respect to a first centerline that passes a center of the plurality of heating bodies in the conveyance direction as a target axis in a plan view.

4. The heating furnace according to claim 1,
wherein the plurality of heating bodies are disposed to exhibit a shape where the plurality of heating bodies are axisymmetric with respect to a second centerline that passes a center of the plurality of heating bodies in the left-right direction as a target axis in a plan view.

5. The heating furnace according to claim 1,
wherein the plurality of heating bodies are disposed to exhibit a shape where the plurality of heating bodies are point-symmetric with respect to a center of the plurality of heating bodies as a target point in a plan view.

6. The heating furnace according to claim 1,
wherein the heating furnace is a multistage heating furnace including a plurality of the planar heaters disposed side by side in a vertical direction.

* * * * *